(12) United States Patent
Jensen et al.

(10) Patent No.: US 12,553,415 B2
(45) Date of Patent: Feb. 17, 2026

(54) SELF-ADJUSTING DRIVE TRACK OF A ROBOTIC DEVICE FOR REPAIRING A WIND TURBINE BLADE

(71) Applicant: BladeRobots A/S, Skanderborg (DK)

(72) Inventors: Ivar J.B.K. Jensen, Hornslet (DK); Aksel Petersen, Ringkøbing (DK)

(73) Assignee: BladeRobots A/S, Skanderborg (DK)

( * ) Notice: Subject to any disclaimer, the term of this patent is extended or adjusted under 35 U.S.C. 154(b) by 0 days.

(21) Appl. No.: 18/716,553

(22) PCT Filed: Dec. 6, 2022

(86) PCT No.: PCT/DK2022/050261
§ 371 (c)(1),
(2) Date: Jun. 5, 2024

(87) PCT Pub. No.: WO2023/104269
PCT Pub. Date: Jun. 15, 2023

(65) Prior Publication Data
US 2025/0035090 A1 Jan. 30, 2025

(30) Foreign Application Priority Data
Dec. 6, 2021 (DK) .......................... PA 2021 70599

(51) Int. Cl.
*F03D 80/50* (2016.01)
*B62D 55/12* (2006.01)
(Continued)

(52) U.S. Cl.
CPC ........... *F03D 80/502* (2023.08); *B62D 55/12* (2013.01); *B62D 55/14* (2013.01); *B62D 55/30* (2013.01); *F05B 2230/80* (2013.01)

(58) Field of Classification Search
CPC ........ B23P 6/002; B23P 6/007; F03D 80/502; F03D 80/50; F05B 2230/80; F05B 2230/90; B62D 55/12; B62D 55/14; B62D 55/30
See application file for complete search history.

(56) References Cited

U.S. PATENT DOCUMENTS

2011/0318496 A1  12/2011  Jensen et al.
2013/0289766 A1  10/2013  Hafenrichter et al.
(Continued)

FOREIGN PATENT DOCUMENTS

CN   108583704 A   9/2018
CN   209274749 U   8/2019
(Continued)

OTHER PUBLICATIONS

Machine Translation of CN 113264125 A (Year: 2021).*
(Continued)

*Primary Examiner* — Christopher J. Besler
(74) *Attorney, Agent, or Firm* — Wood Herron & Evans LLP

(57) ABSTRACT

A drive track (38) for a vehicle includes a frame (80), a drive pulley (86) rotatably coupled to the frame (80) and coupled to a drive (92), an idler pulley (88) rotatably coupled to the frame (80), and a track wheel (96) disposed about the frame (80). The track wheel (96) includes a continuous belt (98) and a plurality of link assemblies (100) coupled to the belt (98). Each link assembly (100) includes a plurality of alignment elements (102) configured to engage with a surface. The alignment elements (102) are configured such that rotation of the belt (98) defines a first movement direction of the vehicle, and are further configured to permit movement of the vehicle in a second movement direction perpendicular to the first movement direction under the weight of the vehicle. The vehicle may be a robotic device (Continued)

(34) for repairing a leading edge (26) of a wind turbine blade (20) and the drive track (38) allows the device (34) to remain aligned with the leading edge (26), such as a curved leading edge (26).

20 Claims, 13 Drawing Sheets

(51) Int. Cl.
*B62D 55/14* (2006.01)
*B62D 55/30* (2006.01)

(56) References Cited

U.S. PATENT DOCUMENTS

| | | |
|---|---|---|
| 2015/0101873 A1 | 4/2015 | Schlee et al. |
| 2020/0025176 A1 | 1/2020 | Georgeson et al. |
| 2020/0080911 A1 | 3/2020 | Hafenrichter et al. |

FOREIGN PATENT DOCUMENTS

| | | |
|---|---|---|
| CN | 113264125 A | 8/2021 |
| KR | 20130026154 A | 3/2013 |

OTHER PUBLICATIONS

Danish Patent and Trademark Office, technical examination issued in corresponding DK application No. PA 2021 70599, dated May 4, 2022.

International Searching Authority, International Search Report and Written Opinion issued in corresponding PCT Application No. PCT/DK2022/050261, dated Apr. 5, 2023.

Isoda T et al., "Omni-directional mobile robot for autonomic offroad running", Robot and Human Communication, 1997, Ro-MAN '97 Proceedings, 6th IEEE International Workshop on Sendai, Japan Sep. 29-Oct. 1, 1997, New York, NY, USA, IEEE, Sep. 29, 1997, pp. 64-69, XP010263176.

* cited by examiner

SELF-ADJUSTING DRIVE TRACK OF A ROBOTIC DEVICE FOR REPAIRING A WIND TURBINE BLADE

TECHNICAL FIELD

This application relates generally to wind turbines, and more particularly relates to a self-adjusting drive track for use with a robotic device for repairing damage along the leading edge of a wind turbine blade.

BACKGROUND

Wind turbines are used to produce electrical energy using a renewable resource and without combusting a fossil fuel. Generally, a wind turbine converts kinetic energy from the wind into electrical power. A conventional wind turbine installation includes a foundation, a tower supported by the foundation, and an energy generating unit positioned atop of the tower. The energy generating unit typically includes one or more nacelles to house several mechanical and electrical components, such as a generator, gearbox, and main bearing, and the wind turbine also includes a rotor operatively coupled to the components in the nacelle through a main shaft extending from the nacelle. Single rotor wind turbines and multi-rotor wind turbines (which may have multiple nacelles) are known, but for the sake of efficiency, the following description refers primarily to single rotor designs. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with many wind turbine installations being located both on land and offshore.

As noted above, blades interact with the wind to generate mechanical rotation of the rotor, which can then be converted into electrical energy. A wind turbine blade is a complex structure that must be constructed to withstand long-term service in an abusive environment, while also maximizing lift and minimizing drag forces. The blades move at varying speeds through the ambient environment surrounding the wind turbine, but often this movement is at high speed. Consequently, the blades will typically experience erosion and damage over time in operation as a result of friction from the air as well as potential impacts from rain, particulate matter, debris, or other items in the air, especially along the leading edge that is configured to face the direction of movement through the wind. The erosion or damage along the leading edge of the blade adversely affects the aerodynamic qualities of the blade over time, resulting in lower power production for given incoming wind speeds. Such erosion and damage on the blades can be corrected by routine maintenance and repair procedures.

The blades are typically formed from a shell of layered fiber composite, aluminum, or similar material with an outer skin defined by a series of layers of coatings (polymeric elastomers, paint, etc.) surrounding and covering an outer surface of the shell. The shell encloses internal components of the blade and isolates them from the environment, including shear webs and spar caps, for example. The outer skin may be defined by several different layers of material, including at least an outermost topcoat, a second layer underneath the outermost topcoat, and a third layer underneath the second layer. Other layers are typically present underneath the third layer as well, including base materials typically made from fiber composites and the like. Damage to the blade outer skin can be categorized into several different levels of severity based on which layer the damage extends to, e.g., an erosion to the third layer would be a "category 2" level of severity, which would be higher than a cut to the second layer, which would be a "category 1" level of severity. For low levels of damage or erosion, such damage can be repaired by depositing a coating onto the area to fill in the damage and restore the blade to the original condition along the leading edge thereof. One such recently developed repair method using a robotic device to repair the eroded surfaces of a wind turbine blade can be reviewed in PCT International Patent Publication No. WO2021/121521, owned by the same owner of the present application.

Automated robotic maintenance devices, such as that disclosed in the '521 Publication referenced above, are positioned on the leading edge of a stopped (and locked) wind turbine blade to repair erosion on the leading edge of the blade. Typically, the blade to be worked upon is positioned in a generally horizontal orientation with the blade pitched so that the leading edge faces upwardly such that the robotic device can then be placed upon the leading edge of the blade. Repairs are then made to the blade by the robotic device as the device is moved along a length of the blade using a drive system.

To repair damage around the leading edge of the wind turbine blade, the robotic device is initially placed on the leading edge of a horizontally positioned blade such that the robotic device is centered on the leading edge. It is important to maintain the centered alignment of the robotic device over the leading edge to assure that a coating of repair material applied to the eroded surface of the leading edge is of appropriate thickness and shape. Uneven or misshapen coatings can lead to early blade failure as well as negatively impact the aerodynamic performance of the blade during use, among other things.

Problems may arise during repair operations should the robotic device become misaligned over the leading edge. This may be caused by initial misplacement of the robotic device on the leading edge or as a result of a drive system of the robotic maintenance device being unable to maintain alignment along a wind turbine blade having a leading edge that is curved between the root end and the tip end of the blade, for example. In this regard, conventional robotic device drive systems tend to move the robotic device in a straight line along the leading edge of the blade, and are generally unable to accommodate for any "out of plane" curvature of the leading edge (see, e.g., the '521 Publication referenced above for a description of a conventional robotic device drive system). Thus, as the robotic device moves over a curved section of the leading edge, the drive tracks continue to drive the robotic device in a straight line resulting in the robotic device becoming uncentered on the leading edge. In some cases, the drive tracks may drive the robotic device over the leading edge and off of the blade, and due care has to be exercised to avoid such an outcome. To this end, any misalignment of the robotic device when initially placed on the leading edge of the blade may be exacerbated by the drive tracks for the same reasons described above.

In view of the above, there is a desire to have a drive system for use with a robotic device that allows for self-alignment of the robotic device on a leading edge of a wind turbine blade to improve the speed and/or precision of such a leading edge repair process. It is further desirable to provide a drive system that maintains alignment on a leading edge that is curved between the root end and the tip end of the wind turbine blade. Thus, further improvements for robotic maintenance and repair systems for wind turbine blades are desired.

SUMMARY

To these and other ends, embodiments of the invention are directed to a robotic maintenance device for repairing damage around a leading edge of a wind turbine blade on a wind turbine is disclosed. The robotic maintenance device includes at least one drive track and an applicator tool supported from the robotic maintenance device. The robotic maintenance device is configured to apply a coating material over the damage on the wind turbine blade as the robotic maintenance device is driven in the first movement direction along the leading edge of the wind turbine blade with the at least one drive track. In accordance with this embodiment, misalignments of the robotic maintenance device over the leading edge of the wind turbine blade, such as due to a curved or non-linear leading edge, may be corrected through self-adjusting movement of the robotic maintenance device in the second movement direction by the at least one drive track under the weight of the robotic maintenance device.

The drive track, capable of self-adjusting movements that allow the vehicle to remain in an aligned position along a travel path, such as a curved travel path. This may be achieved by providing the drive track with two independent directions of movement. In one aspect of the invention, the drive track includes an elongate frame, at least one drive pulley rotatably coupled to the frame, at least one idler pulley rotatably coupled to the frame, and a track wheel disposed about the frame. The at least one drive pulley is configured to be operatively coupled to a drive for rotating the at least one drive pulley. The track wheel includes a continuous belt in engagement with the at least one drive pully and the at least one idler pulley and is configured to be rotated about the frame by the at least one drive pulley. A plurality of link assemblies is coupled to the continuous belt and each link assembly includes a plurality of alignment elements configured to engage with a surface over which the vehicle is intended to travel. The plurality of alignment elements is configured such that rotation of the continuous belt defines a first movement direction of the vehicle along the surface. The plurality of alignment elements is further configured to allow movement of the vehicle along the surface in a second movement direction substantially perpendicular to the first movement direction under the weight of the vehicle.

In a first embodiment, each of the plurality of alignment elements may include a roller with at least one O-ring formed of a friction material that is configured to grip the surface sufficiently to allow the drive track to propel the vehicle in the first movement direction. In this embodiment, each roller has an axis of rotation that is substantially parallel to the first movement direction of the vehicle. The rotation of the rollers about their respective axes is what allows the movement of the vehicle along the surface in the second movement direction. In a second embodiment, the plurality of alignment elements may include a plurality of flexure elements, wherein each of the plurality of flexure elements is capable of flexing in the second movement direction, thereby allowing the vehicle to move along the surface in the second movement direction. In one embodiment, the flexure elements may include relatively thin flexible fins or blades that extend in the first movement direction, for example, but flex in the second movement direction. In an exemplary embodiment, the flexible fins may be arranged in one or more lamellas on the link assemblies.

In one embodiment, each link assembly may support the plurality of alignment elements in a V-shaped arrangement. For example, each link assembly may include a first bracket and a second bracket, each bracket including a sidewall with a pair of angled edges forming a V-shape with a vertex. At least one of the plurality of alignment elements may be disposed between the first and second brackets on each side of the vertex. The alignment element closest to the vertex on a first side of the link assembly may define a first proximal alignment element and an alignment element closest to the vertex on a second side of the link assembly may define a second proximal alignment element. In one embodiment, a distance between the first proximal alignment element and the second proximal alignment element may be varied for each link assembly in a series of adjacent link assemblies to define an alignment element pattern for the series of adjacent link assemblies. In an exemplary embodiment, the alignment element pattern may be repeated along a length of the continuous belt. Moreover, the alignment element pattern may further include varying a number of the plurality of alignment elements supported by at least two link assemblies in the series of adjacent link assemblies. For example, some of the link assemblies in the series may include six alignment elements while other link assemblies in the series may include four alignment elements. In one embodiment, the plurality of link assemblies may be spaced substantially equally apart along a length of the continuous belt. Alternatively, the link assemblies may be non-uniformly spaced along the length of the continuous belt.

In one embodiment, the elongate frame may include a pair of spaced apart side plates. The at least one drive pulley may be rotatably coupled between the pair of spaced apart side plates adjacent a first end of the frame and the at least one idler pulley may be rotatably coupled between the pair of spaced apart side plates adjacent a second end of the frame. In one embodiment, each side plate may include an upper track wheel support and a lower track wheel support configured to engage with multiple of the plurality of link assemblies. The lower track wheel support may include a first arcuate finger and a second arcuate finger located at opposite longitudinal ends of the lower track wheel support that are configured to guide the plurality of link assemblies onto or off of the surface during operation of the vehicle.

In one embodiment, the at least one idler pulley may include a tensioning screw for adjusting a tension of the continuous belt. Moreover, the elongate frame may include an elongate support member configured to couple the drive track to the vehicle. In one embodiment, the elongate support member may be disposed transverse to the elongate frame. The elongate support member may be operatively coupled to the frame with a bushing assembly that allows the drive track to rotate relative to the vehicle about a yaw axis. Additionally, the elongate support member may include a first end and a second end each movably coupled to the vehicle with a bracket that allows the drive track to rotate relative to the vehicle about a pitch axis.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

With reference to FIGS. 1 through 12, embodiments of a drive track configured to be used with a robotic (automated or semi-autonomous) maintenance device are shown in detail. The robotic maintenance device is for repairing damage around a leading edge of a wind turbine blade. The robotic maintenance device may include one or more drive tracks according to embodiments of the invention, each of which is configured to engage the wind turbine blade adjacent its leading edge to move the robotic maintenance device therealong to carry out repair actions. In this regard, the robotic maintenance device includes an applicator tool for repairing so-called category-1 and category-2 damage to the outer skin of a wind turbine blade near a leading edge. For repair actions, it is important to maintain alignment of the robotic maintenance device and the applicator tool over the leading edge to ensure proper repair of the damaged surfaces of the wind turbine blade. Thus, embodiments of the drive track operate to produce a steady movement of the maintenance device along the blade during repair and maintenance actions. Moreover, embodiments of the drive track are also configured to maintain alignment and positioning of the robotic maintenance and applicator tool over the leading edge through repeated self-adjustment to correct any misalignment of the robotic maintenance device over the leading edge. This is especially relevant when the leading edge is curved and the robotic maintenance device must remain aligned along a curved travel path.

As will be explained in further detail below, in one embodiment, the drive track includes a self-adjusting track wheel capable of moving the drive track and robotic maintenance device in two movement directions relative to the leading edge of the wind turbine blade. Thus, the drive track may be referred to as a two degree of freedom system, enabling a first movement direction that is along the leading edge of the wind turbine blade and a second movement direction that is generally perpendicular to the leading edge of the wind turbine blade. The second movement direction allows for self-adjustment, or reorientation of the drive track and robotic maintenance device over the leading edge (e.g., curved leading edge) as the robotic maintenance device travels therealong, as described in further detail below. Due to the drive track, the robotic maintenance device may be actively driven in the first movement direction, such as by a suitable motor or other drive, but may be passively driven in the second movement direction using, for example, the weight of the robotic maintenance device to correct misalignments in that direction.

Figure 1:
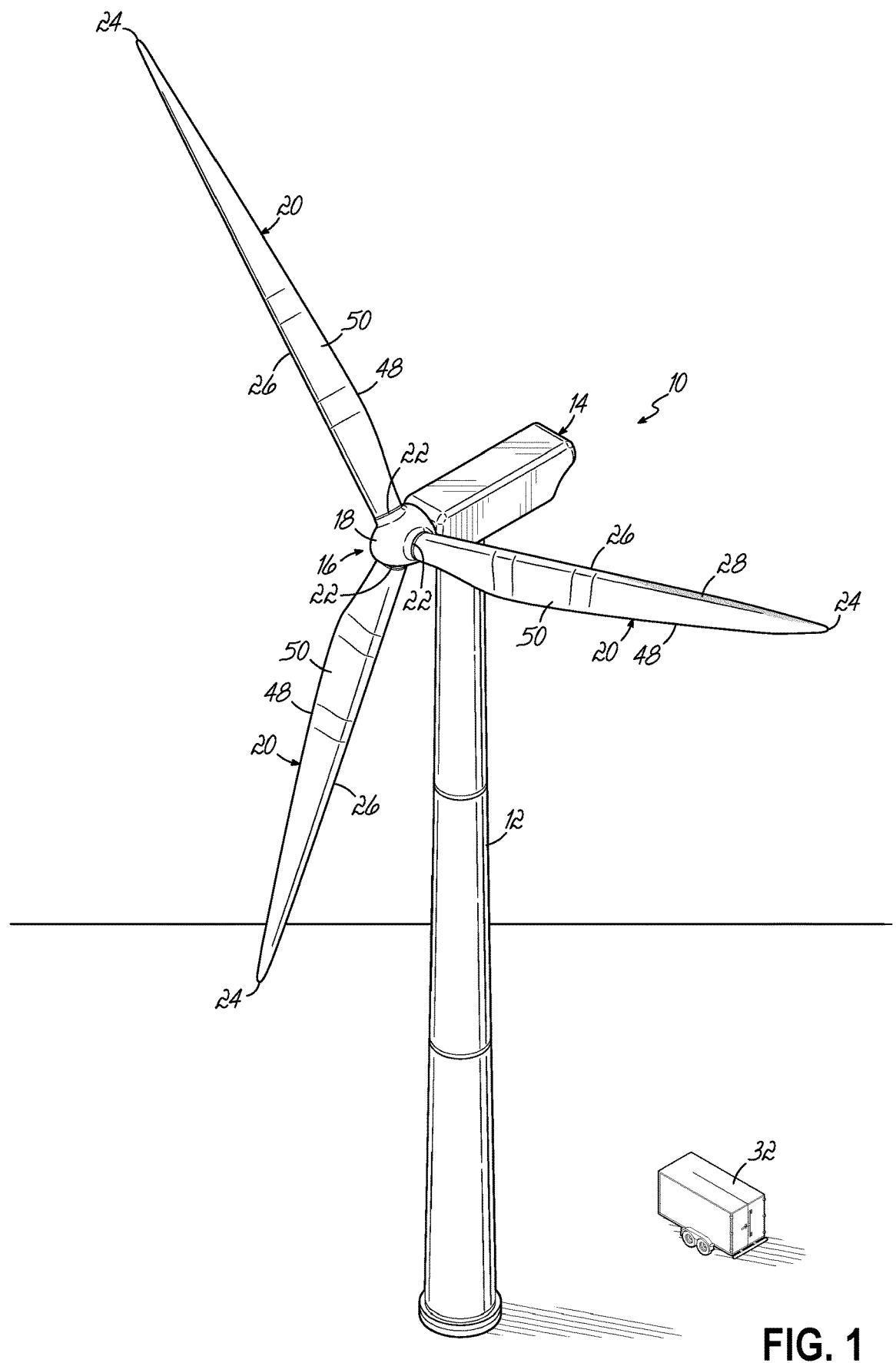
FIG. 1 is a perspective view of a wind turbine illustrating damage along a leading edge of a wind turbine blade.

With reference to FIG. 1, a wind turbine 10 is shown and includes a tower 12, a nacelle 14 disposed at the apex of the tower 12, and a rotor 16 operatively coupled to a generator (not shown) housed inside the nacelle 14. The rotor 16 of the wind turbine 10 includes a central hub 18 and a plurality of wind turbine blades 20 that project outwardly from the central hub 18 at locations circumferentially distributed around the hub 18. As shown, the rotor 16 includes three wind turbine blades 20, but the number of blades 20 may vary from one wind turbine to another. Each wind turbine blade 20 is elongate and includes a root end 22 which is configured to be coupled to the central hub 18 when mounted to the rotor 16, and a tip end 24 longitudinally opposite to root end 22. The wind turbine blades 20 are configured to interact with air flow to produce lift that causes the rotor 16 to spin generally within a plane defined by the wind turbine blades 20. As the rotor 16 spins, the wind turbine blades 20 pass through the air with a leading edge 26 leading the respective wind turbine blade 20 during rotation.

As the wind turbine 10 ages, one or more of the wind turbine blades 20 may experience erosion from prolonged, continuous exposure to the environment. One example of such erosion damage 28 is shown in FIG. 1 and better shown in the detailed view of FIG. 2. While not being particularly limited to any source, erosion damage 28 may occur due to particulates in the air that abrade the leading edge 26 of the wind turbine blade 20 during operation. Erosion therefore may occur in an erosion zone that includes the leading edge 26, but it may also occur in other areas in the surface of the blade 20. Accordingly, while the robotic maintenance device and embodiments of the drive track are shown and described as being used to move the robotic maintenance device along the leading edge 26 to repair damage to surfaces on or near the leading edge 26 of the blade 20, it is understood that the robotic maintenance device and associated drive tracks may also be capable of moving along other surfaces of the blade 20 to conduct repair actions, for example.

Figure 2:
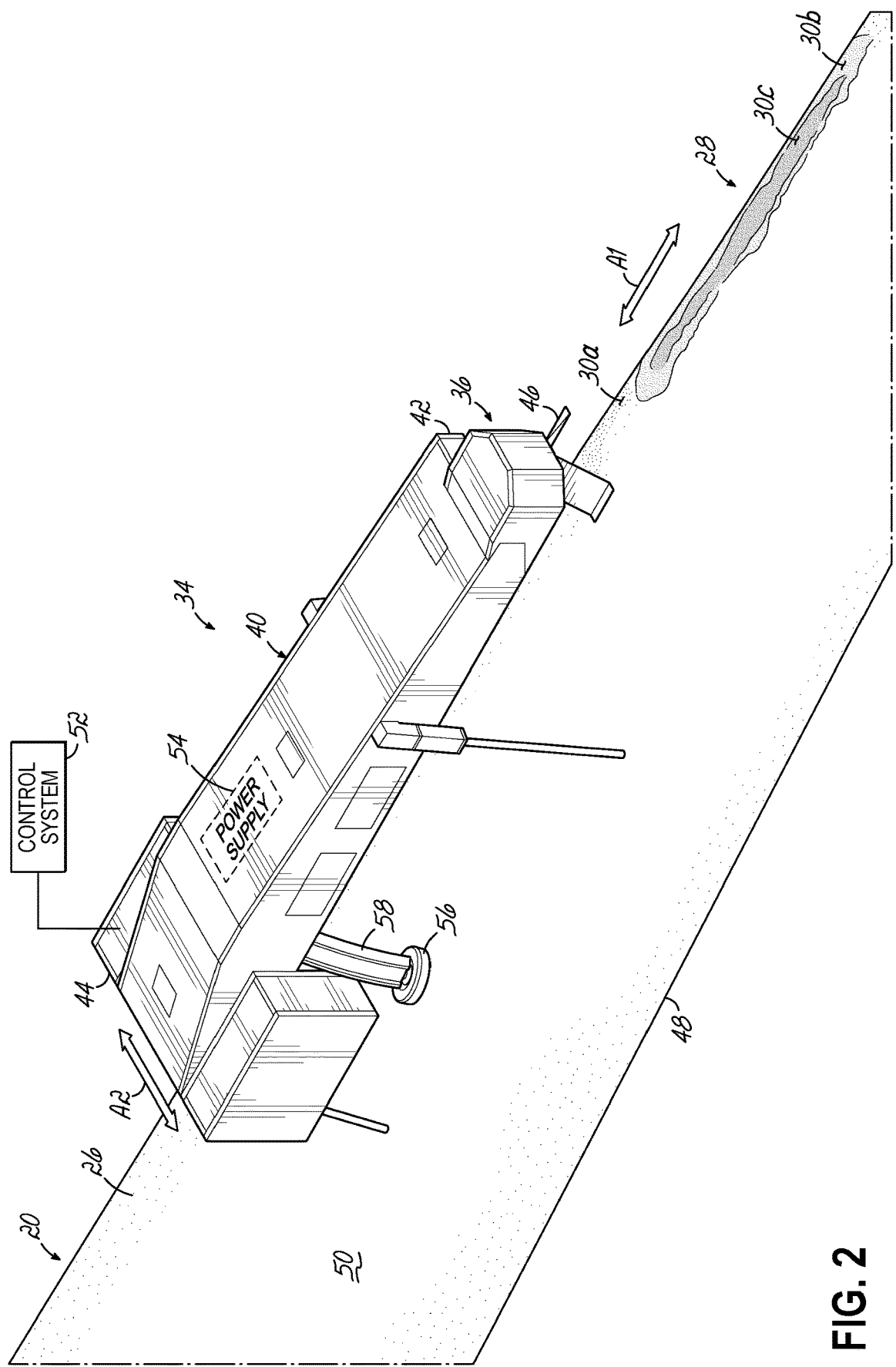
FIG. 2 is a top perspective view of a robotic maintenance device for repairing damage to a leading edge of a wind turbine blade, the robotic maintenance device including a drive system in accordance with an embodiment of the invention.

Erosion damage 28 is generally characterized as a loss of material from the wind turbine blade 20. Material loss may be uniformly distributed but is often non-uniform across the leading edge 26 or any other surface of the wind turbine blade 20. Rather than losing a uniform skin of material from a surface, erosion may include localized surface imperfections, such as random pitting and shallow gouges or crack-like features that may be a result of localized, connected pitting (as a result of impacts with debris or other matter in the environment). In any case, if erosion damage 28 is not repaired in a timely fashion, the wind turbine blade 20 may become less efficient at rotating the rotor 16 and, ultimately, the structural integrity of the wind turbine blade 20 may be significantly impaired. With reference to FIG. 2, it will be understood that the erosion damage 28 may define differing levels of severity based on how deep the damage 28 extends inwardly into the material layers defining the outer shell of the blade 20. In the example shown, the erosion damage 28 includes some areas with an erosion or cut of material through the outer topcoat layer into a second layer of material underneath the topcoat, which is categorized as a "category 1" level of severity, and further areas with an erosion or cut of material through the outer topcoat layer and the second later of material into a third layer of material underneath the second layer, which is categorized as a "category 2" level of severity. For reference, deeper cuts and erosions defining more significant damage is typically categorized at higher levels such as category 3, 4, or 5. In FIG. 2, the topcoat is shown at 30a, the revealed areas of second layer are shown at 30b, and the revealed areas of third layer are shown at 30c. By identifying and properly correcting such lower levels of erosion damage 28 promptly by maintenance-style "repair actions," more significant damage of the blade 20 can be avoided along with higher operational downtime caused by the more significant damage.

One such method of repairing blade damage 28 of the type described above involves the use of a robotic maintenance device (also referred to as a "robotic repair device" or just "robotic device") which may be transported to the wind turbine site to complete necessary repairs to the blade 20. In this regard, FIG. 1 shows a transport trailer 32 for storing and transporting the robotic maintenance device. The transport trailer 32 may be towed by a motorized vehicle (not shown) to transport the robotic maintenance device to the site where the wind turbine 10 requiring blade 20 repair is located. To conduct blade 20 repairs, the robotic maintenance device may be unloaded from the transport trailer 32 and lifted into position on the leading edge 26 of the wind turbine blade 20 using a boom crane or flying vehicle, such as an unmanned aerial vehicle (UAV), for example. In other embodiments, the robotic maintenance device may be stored in a container within range of the wind turbine 10 and then transported to the wind turbine 10 (such as by the aforementioned UAV) whenever a repair action is necessary.

Figure 3:
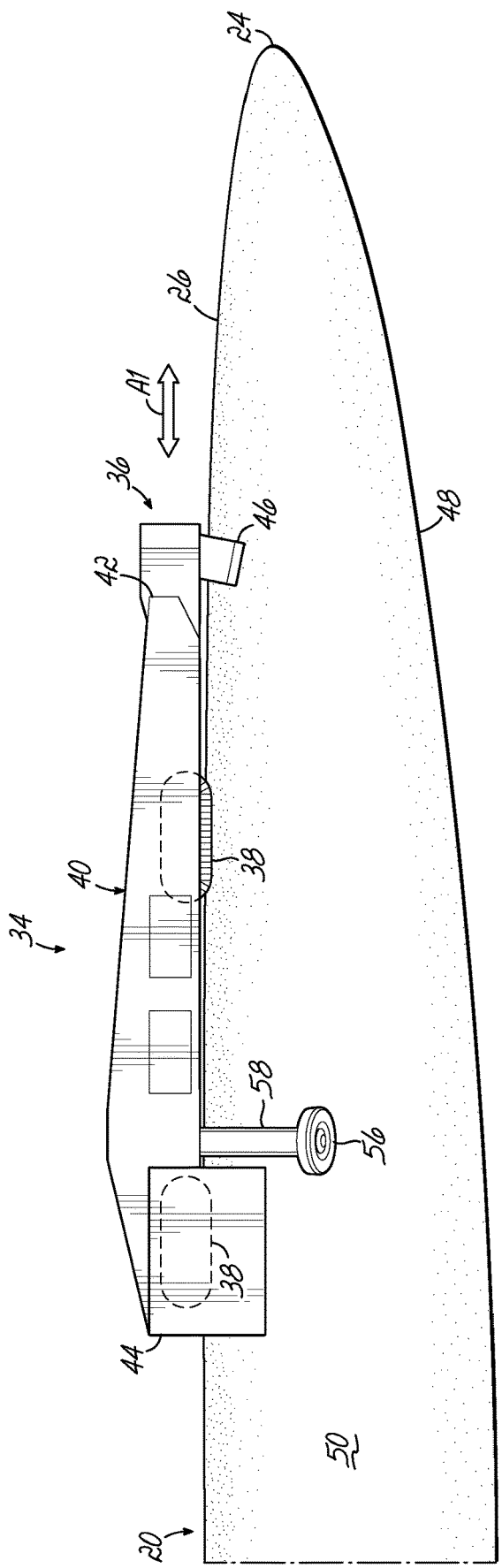
FIG. 3 is a side view of the robotic maintenance device having two drive tracks used to move the robotic maintenance device along the leading edge of a wind turbine blade.

With reference to FIGS. 2 and 3, it will be appreciated that the wind turbine 10 is stopped with the blade 20 to be worked upon in a generally horizontal orientation with the blade 20 pitched so that the leading edge 26 faces upwardly such that the robotic maintenance device can then be placed upon the blade 20, as shown in these figures. In this regard, an exemplary robotic maintenance device 34 is shown positioned on the leading edge 26 of the wind turbine blade 20 to effectuate repair of the erosion damage 28. As shown, the robotic maintenance device 34 may be equipped with an applicator tool 36 that is configured to apply and form a coating material into a smooth and continuous coating over the erosion damage 28 as the robotic maintenance device 34 moves along the leading edge 26. The shape of the coating material applied by the applicator tool 36 is configured to adequately repair the damaged area 28 of the blade 20 while also minimizing aerodynamic disruptions of the air flow over the blade 20. The robotic maintenance device 34 also includes one or more drive track(s) 38 (FIG. 3) for moving the robotic maintenance device 34 along the leading edge 26, as will be described in further detail below. To this end, the robotic maintenance device 34 houses components required to mechanically and electrically operate the applicator tool 36 and the one or more drive tracks 38.

With continued reference to FIGS. 2 and 3, the robotic maintenance device 34 includes a main body 40 (also referred to as a main chassis) that extends between a first end 42 and a second end 44 of the robotic maintenance device 34. As shown, the main body 40 of the robotic maintenance device 34 is configured to be aligned over the leading edge 26 of the blade 20 and generally defines a framework for other components of the robotic maintenance device 34 to be mounted. In this regard, the applicator tool 36 is located at the first end 42 of the main body 40 which is configured to support the applicator tool 36 over the leading edge 26 of the blade 20, as shown. The applicator tool 36 may include a spatula 46 configured to form the applied coating material into a generally uniform coating that in cross section is typically thickest adjacent the leading edge 26 of the blade 20 and then decreases in thickness in a generally continuous and smooth manner in a direction toward a trailing edge 48 of the blade 20. However, the shape of the applied coating material is dependent upon the positioning of the robotic maintenance device 34 on the leading edge 26. For example, when the robotic maintenance device 34 is aligned over the leading edge 26 such that the leading edge 26 is positioned generally squarely within the spatula 46 (e.g., FIG. 2), a properly shaped coating may be formed on the leading edge 26. Misalignment of the robotic maintenance device 34 over the leading edge 26 for any prolonged period of time (e.g., the spatula 46 is deviated to one side 50 of the blade 20 or the other) can cause uneven or misshapen coatings. Uneven or misshapen coatings can impact blade 20 performance as well as lead to early blade 20 failure. Thus, to achieve a repair with minimal impact on the performance of the blade 20, it is important to maintain alignment of the robotic maintenance device 34 and applicator tool 36 over the leading edge 26.

As shown in FIG. 2, the robotic maintenance device 34 includes a control system 52, shown schematically, and implemented on known hardware and software platforms. The control system 52 is operatively connected to the components of the robotic maintenance device 34, including the one or more drive tracks 38, applicator tool 36, and associated components. More particularly, the control system 52 is capable of responding to inputs from onboard components of the maintenance device 34 and/or from an offsite operator to modify or initiate the actions taken by the maintenance device 34. For example, the control system 52 is configured to allow an offsite operator to control movement of the one or more drive tracks 38 and thus movement of the robotic maintenance device 34 along the wind turbine blade 20. Additionally, or alternatively, control of the one or more drive tracks 38 may be sensor-based and movement of the maintenance device 34 may be modified based on real-time feedback or inputs detected by sensors located on the maintenance device 34. To this end, the maintenance device 34 may include sensors operatively coupled to the control system 52, such as one or more position sensors, velocity sensors, video cameras, touch sensors, proximity sensors, and/or other suitable sensors for controlling the one or more drive tracks 38 and movement of the robotic maintenance device 34.

Additionally, a power supply 54, such as a battery pack, may be mounted on the maintenance device 34 for supplying power to components of the maintenance device 34 such as the control system 52, the one or more drive tracks 38, and the applicator tool 36, for example. The power supply 54 is shown schematically in FIG. 2 and may be configured to power those components and systems so that the maintenance device 34 can repair an entire leading edge 26 of a wind turbine blade 20, for example. The power supply 54 may also be used to provide operating power to additional elements or modules that may be connected to the maintenance device 34 as well.

As shown in FIGS. 2 and 3, the maintenance device 34 also includes two or more wheels 56 coupled to the main body 40 of the maintenance device 34 to stabilize the maintenance device 34 as it is moved along the leading edge 26 by the one or more drive tracks 38. More particularly, one wheel 56 may be supported on either side of the maintenance device 34. In this regard, each wheel 56 is supported by a respective support arm 58 that extends from an underside of the maintenance device 34 to position wheels 56 on either side of the maintenance device 34. Each support arm 58 is configured to place the corresponding wheel 56 in engagement with a side surface 50 of the wind turbine blade 20, as shown. The engagement between each side surface 50 of the blade 20, or shell half, and the wheels 56 steadies movement of the maintenance device 34 as it moves along the wind turbine blade 20. The support arms 58 may be curved to conform to the shape of the wind turbine blade 20. The curvature of the support arms 58 results in a predictable contact point between the wheels 56 and the surfaces 50 of the wind turbine blade 20, which is preferably below the leading edge 26 and damaged area 28. The support arms 58 may be adjustable to accommodate for the varying thickness of the wind turbine blade 20. Each wheel 56 can freely rotate along the corresponding side surface 50 of the blade 20 in response to movements of the maintenance device 34 generated by the drive tracks 38. Each wheel 56 may be formed from a plastics material or any other suitable material that is a moderate to low friction material to help avoid any damage upon engagement with the blade 20. To this end, the wheels 56 and the one or more drive tracks 38 produce a steady movement of the maintenance device 34 along the blade 20 and operate to maintain alignment of the applicator tool 36 over the leading edge 26 of the blade 20 during repair and maintenance actions.

With reference to FIG. 3, the exemplary robotic maintenance device 34 includes two drive tracks 38 for moving the robotic maintenance device 34 along the leading edge 26 to conduct repair actions. The drive tracks 38 are operatively coupled to the main body 40 of the maintenance device 34 such that a portion of each drive track 38 extends from the main body 40 to engage with the wind turbine blade 20. In this regard, the drive tracks 38 are positionable on the leading edge 26 to thereby space the main body 40 of the maintenance device 34 a slight distance above the leading edge 26. While the exemplary robotic maintenance device 34 includes two drive tracks 38, it is understood that the robotic maintenance device 34 may include fewer or more drive tracks 38 as desired. In any event, the drive tracks 38 are spaced apart along a length of the robotic maintenance device 34 with one drive track 38 being located near the second end 44 of the maintenance device 34 and the other drive track 38 being located in a region between the center and the first end 42 of the maintenance device 34. To this end, the two drive tracks 38 operate in unison to propel the robotic maintenance device 34 along the leading edge 26 of the wind turbine blade 20.

Figure 4:
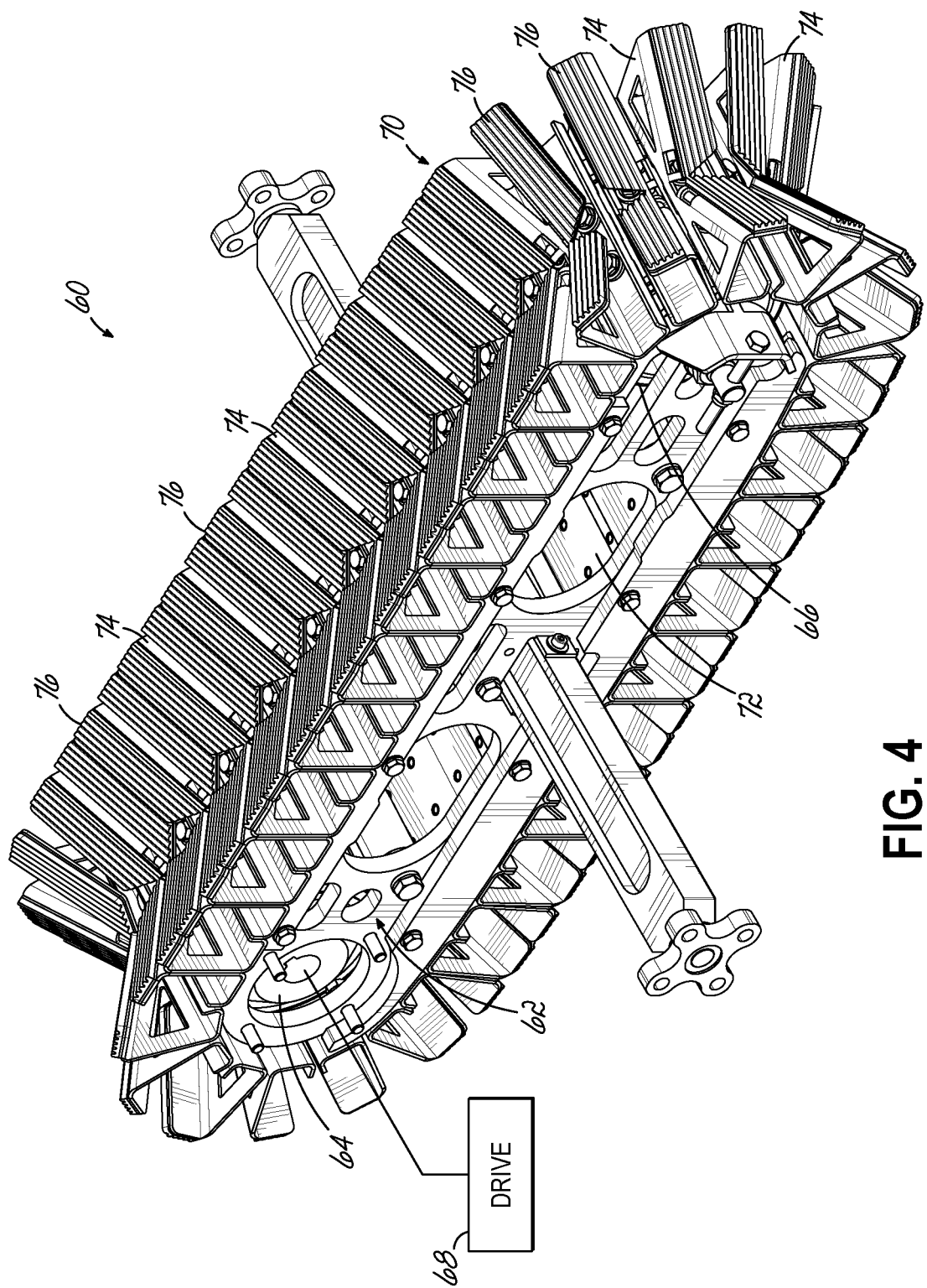
FIG. 4 is a top perspective view of a drive track for a robotic maintenance device.

FIG. 4 shows a drive track 60 configured to be used with a robotic maintenance device 34 (in place of drive tracks 38) to move the robotic maintenance device 34 along the leading edge 26 of the wind turbine blade 20 according to an embodiment of the invention. The drive track 60 of this embodiment may be suitable for use with a wind turbine blade 20 having a generally straight leading edge 26. As shown, the drive track 60 includes a frame 62 that rotatably supports a drive pulley 64 and an idler pulley 66. The drive pully 64 is configured to be operatively coupled to a drive 68, shown schematically, for rotating the drive pulley 64. The drive track 60 further includes a track wheel 70 disposed about the frame 62. More particularly, the track wheel 70 includes a continuous belt 72 having a plurality of V-shaped treads 74 configured to engage with the leading edge 26 of the wind turbine blade 20. Each tread 74 includes gripping pads 76 formed from high friction material for gripping surfaces of the wind turbine blade 20. As shown, the continuous belt 72 is in engagement with the drive pully 64 and the idler pulley 66 to be rotated about the frame 62 by the at least one drive pulley 64. When a robotic maintenance device having such a drive track 60 is positioned on the wind turbine blade 20 with the track wheel 70 of the drive track 60 engaged with the leading edge 26 (e.g., FIG. 3), rotation of the continuous belt 72 and track wheel 70 cause movement of the robotic maintenance device 34 along the leading edge 26. In this regard, the rotation of the continuous belt 72 and track wheel 70 about the frame 62 defines a first movement direction of the robotic maintenance device 34 along the leading edge 26 of the wind turbine blade 20. The first movement direction of the robotic maintenance device 34 will be indicated by directional arrow(s) A1 throughout this disclosure. In this regard, the movement direction A1 of the robotic maintenance device 34 by the drive track(s) 60 is either generally toward or away from the root end 22 or tip end 24 of the blade 20.

The drive track 60 described above may be referred to as a single degree of freedom system. That is, the drive track 60 only permits linear movement (e.g., forward and backward movement) of the robotic maintenance device 34 along a single axis (e.g., defined by the leading edge 26). In this regard, the single degree of freedom provided by drive track 60 may be unsuitable in some circumstances, such as for wind turbine blades 20 having an out of plane curved leading edge 26. For example, gripping pads 76 of the treads 74 result in a high coefficient of friction between the treads 74 and the engaged surfaces of the wind turbine blade 20. For example, the treads 74 are extremely effective at preventing slippage or movement between the treads 74 and the wind turbine blade 20. However, while preventing slippage between the track wheel 70 and the wind turbine blade 20 is a beneficial feature for moving the maintenance device 34 in the first movement direction A1, it can also be detrimental and can cause the robotic maintenance device 34 to become misaligned over the leading edge 26.

For example, if the robotic maintenance device 34 is initially positioned on the leading edge 26 with the drive tracks 60 misaligned with the leading edge 26 (e.g., the leading edge 26 is not positioned squarely within the V-shaped pocket formed by the treads 74), operation of the drive tracks 60 may continue to move the robotic maintenance device 34 out of alignment with the leading edge 26 by nature of the high coefficient of friction between the treads 74 and the wind turbine blade 20. That is, the weight of the robotic maintenance device 34 is not sufficient to overcome the friction and allow the robotic maintenance device 34 to adjust so that the leading edge 26 is squarely positioned within the V-shaped pocket formed by the treads 74. Instead, the high friction may allow the robotic maintenance device 34 to climb up the side 50 of the blade 20 and over the leading edge 26. Thus, poor initial placement of the robotic maintenance device 34 may be detrimental to successful repair.

In another example, the wind turbine blade 20 may have a curved leading edge 26. In use, the drive tracks 60 may continue to drive the robotic maintenance device 34 in a straight line as the robotic maintenance device 34 encounters the curvature of the leading edge 26. The result is that the drive tracks 60 may climb up the side 50 of the blade 20 and over the leading edge 26. Thus, in both scenarios, the drive tracks 60 will eventually drive the robotic maintenance device 34 off the blade 20 if not stopped. To this end, the only way to correct misalignment of a robotic maintenance device 34 equipped with drive tracks 60 is through manual intervention, which can be costly, resulting in prolonged operational downtime. As described in further detail below, the drive track 38 in accordance with other embodiments of the invention improves the repair process for all types of blades 20, but particularly those with a curved leading edge 26, to thereby make automated or semi-automated repairs with the robotic maintenance device 34 more efficient and less time-consuming. To this end, the drive track 38 also corrects for poor initial placement of the robotic maintenance device 34 on the wind turbine blade 20.

Figure 5:
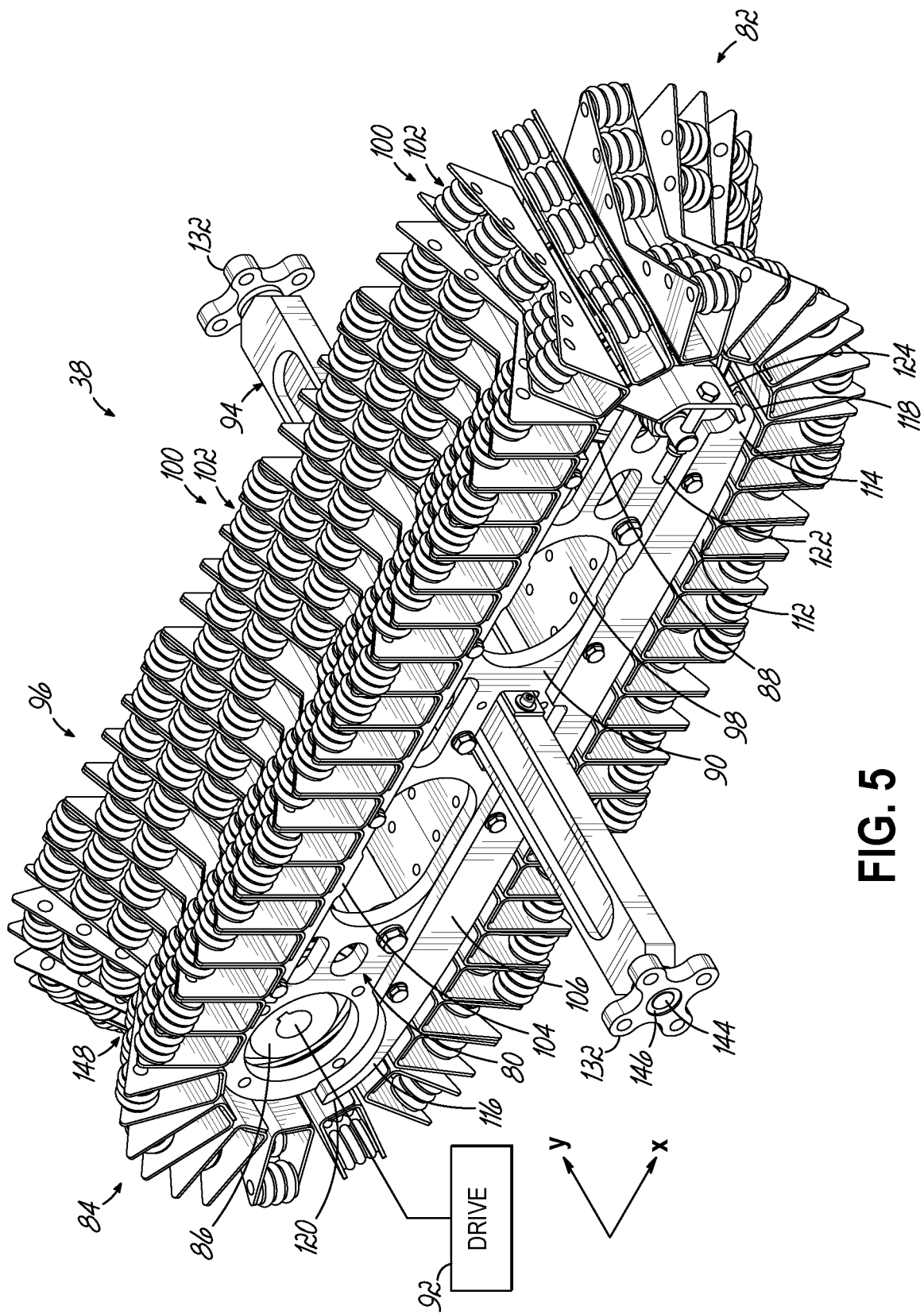
FIG. 5 is a top perspective view of a drive track in accordance with an embodiment of the present invention.
Figure 6:
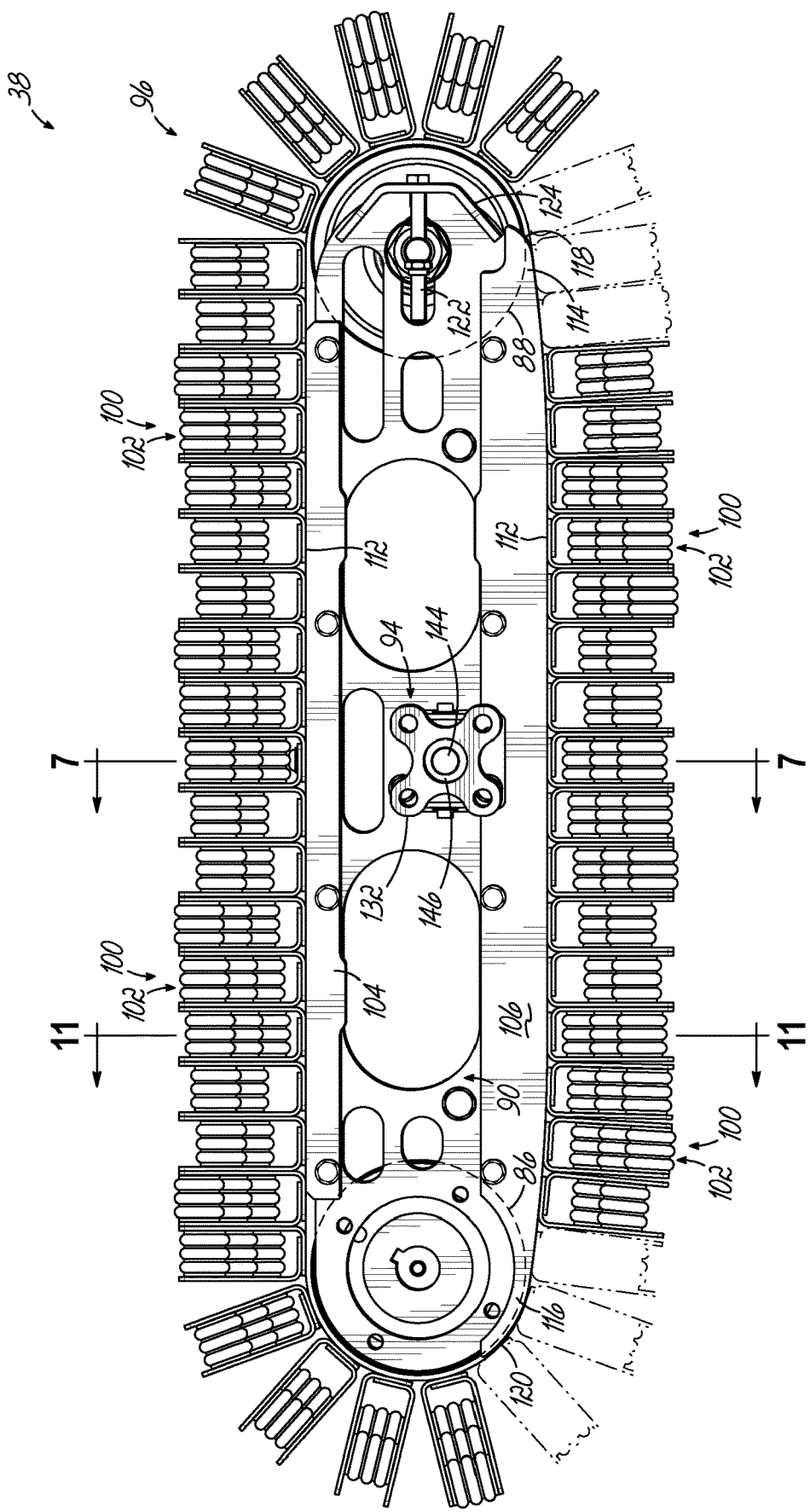
FIG. 6 is a side view of the drive track shown in FIG. 5.

FIGS. 5-12 illustrate the drive track 38 in accordance with another embodiment of the invention. In accordance with this embodiment, the drive track 38 includes an elongate frame 80 extending between a first end 82 and a second end 84 of the drive track 38. In this regard, when coupled to the robotic maintenance device 34, the first end 82 of the drive track 38 is facing the first end 42 of the robotic maintenance device 34 (e.g., FIG. 3). As shown in FIGS. 5 and 6, the frame 80 rotatably supports at least one drive pulley 86 and at least one idler pulley 88 between a pair of spaced apart side plates 90. The at least one drive pully 86 is configured to be operatively coupled to a drive 92, shown schematically, for rotating the at least one drive pulley 86. The drive 92 may be a motor such as a direct current (DC) brushed or brushless motor, alternating current (AC) brushed or brushless motor, servo motor, linear motor, or any other suitable motor for rotating the drive pulley 86. The drive track 38 also includes an elongate support member 94 disposed centrally through the frame 80. The support member 94 is used to operatively couple the drive track 38 to the main body 40 of the robotic maintenance device 34, as described in additional detail below. The drive track 38 further includes a track wheel 96 disposed about the frame 80. The track wheel 96 includes a continuous belt 98 having a plurality of link assemblies 100 coupled thereto. The continuous belt 98 is in engagement with the at least one drive pully 86 and the at least one idler pulley 88 to be rotated about the frame 80 by the at least one drive pulley 86 under the power of drive 92. Each link assembly 100 includes a plurality of self-adjusting alignment elements 102 configured to engage with the wind turbine blade 20, as described in further detail below. The alignment elements 102 are configured to allow the robotic maintenance device 34 to adjust to misalignments due to, for example, curvature in the leading edge 26 of the blade 20.

The drive track 38 in accordance with embodiments of the invention may be referred to as a two degree of freedom system. In that regard, when the robotic maintenance device 34 is positioned on the wind turbine blade 20 with the track wheel 96 of the drive track 38 engaged with the leading edge 26 (e.g., FIG. 3), rotation of the track wheel 96 about the frame 80 produces steady movement of the robotic maintenance device 34 along the leading edge 26. More particularly, rotation of the track wheel 96 about the frame 80 defines a first movement direction A1 of the robotic maintenance device 34 along the leading edge 26 of the wind turbine blade 20. The first movement direction A1 of the robotic maintenance device 34 is either generally toward or away from the root end 22 or tip end 24 of the blade 20. To this end, the first movement direction A1 constitutes a first degree of freedom of the drive track 38 along a first axis (e.g., an X axis generally parallel with a longitudinal axis of the blade 20). Movement in the first movement direction A1 is purposeful, active movement, caused and controlled by activation of the drive 92.

Additionally, the plurality of alignment elements 102 of multiple link assemblies 100 engaged with the blade 20 adjacent the leading edge 26 permits movement of the robotic maintenance device 34 in a second movement direction A2 (e.g., FIG. 2). The second movement direction of the robotic maintenance device 34 will be indicated by directional arrow(s) A2 throughout this disclosure. In this regard, the second movement direction A2 of the robotic maintenance device 34 by the drive track(s) 38 may be substantially perpendicular to the first movement direction A1. As described in further detail below, movement of the robotic maintenance 34 in the second movement direction A2 is enabled by the alignment elements 102 and caused by the weight of the robotic maintenance device 34 should the robotic maintenance device 34 become misaligned over the leading edge 26. Thus, movement of the robotic maintenance device 34 in the second movement direction A2 realigns, or reorients, the robotic maintenance device 34 over the leading edge 26. To this end, the second movement direction A2 constitutes a second degree of freedom of the drive track 38 along a second axis (e.g., a Y axis generally perpendicular to the longitudinal axis of the blade 20). Movement in the second movement direction A2 is passive movement which occurs automatically under the weight of the robotic maintenance device 34.

Figure 7:
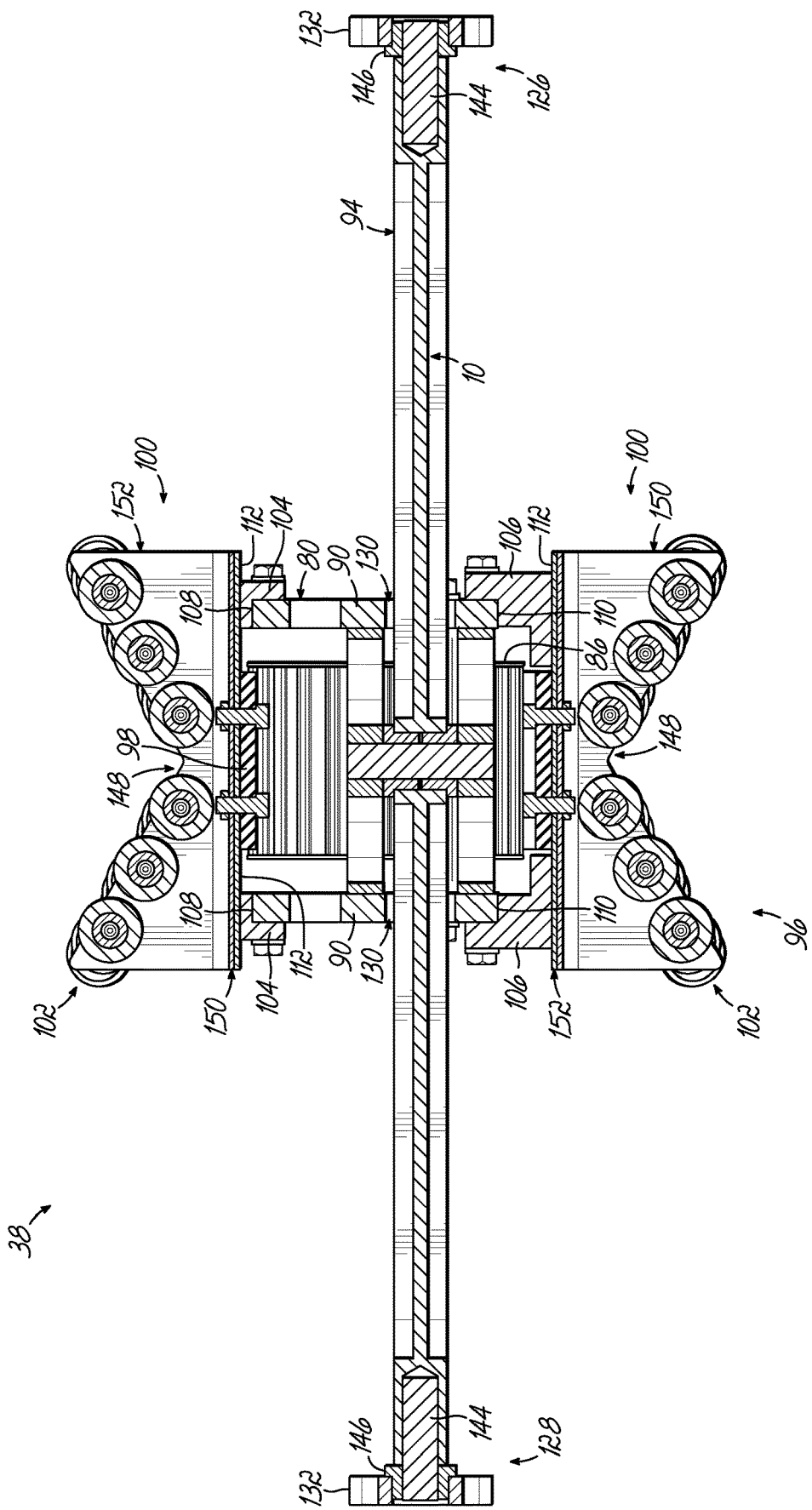
FIG. 7 is a cross-sectional view through the drive track shown in FIG. 6 generally along the line 7-7.

With reference to FIGS. 5-7, the drive track 38 includes a pair of aligned upper track wheel supports 104 and a pair of aligned lower track wheel supports 106, each of which are configured to guide movement of the track wheel 96, and more particularly the link assemblies 100, as the continuous belt 98 is rotated about the frame 80. As shown in FIG. 6, the lower track wheel support 106 and upper track wheel support 104 each have a length that extends generally between the first end 82 and the second end 84 of the drive track 38. The length of the lower track wheel support 106 may be longer compared to the length of the upper track wheel support 104. As shown in FIG. 7, each side plate 90 includes one upper track wheel support 104 extending along a top edge 108 of the side plate 90 and one lower track wheel support 106 extending along a bottom edge 110 of the side plate 90. Each track wheel support 104, 106 extends outwardly from the frame 80, a distance from the respective top or bottom edge 108, 110 of the side plate 90, and is configured to engage with a base 112 of each link assembly 100 as it is rotated about the frame 80. In this regard, the base 112 of each link assembly 100 is in engagement with and slides along the pair of upper track wheel supports 104 as the link assembly 100 is moved along the top edges 108 of the frame 80. Similarly, the base 112 of each link assembly 100 is in engagement with and slides along the pair of lower track wheel supports 106 as the link assembly 100 is moved along the bottom edges 110 of the frame 80.

With reference to FIGS. 5 and 6, as the drive track 38 moves the robotic maintenance device 34 along the leading edge 26 wind turbine blade 20 in the first movement direction A1, the track wheel 96 is rotated about the frame 80 to continuously place link assemblies 100 in engagement with the leading edge 26 at the first end 82 of the drive track 38 and remove link assemblies 100 from engagement with the leading edge 26 at the second end 84 of the drive track 38. In this regard, the pair of lower track wheel supports 106 are configured to facilitate the motion of each link assembly 100 as it is moved into engagement with the leading edge 26 as well as facilitate the lifting away motion of each link assembly 100 as it is removed from the leading edge 26. More particularly, each lower track wheel support 106 includes a first finger 114 and a second finger 116 located at opposite longitudinal ends of the lower track wheel support 106. The first finger 114 is located adjacent to the first end 82 of the drive track 38 and is configured to guide movement of each link assembly 100 from the idler pulley 88 and into engagement with the leading edge 26. In this regard, the first finger 114 has an arcuate or radiused edge 118 that allows each link assembly 100 to rotate to a downward facing position to place the respective alignment elements 102 into contact with the leading edge 26. The second finger 116 is located at the second end 84 of the drive track 38 and is configured to guide movement of each link assembly 100 from the leading edge 26 to the drive pulley 86. The second finger 116 is longer compared to the first finger 114 and extends partially about the frame 80 at the second end 84. In this regard, the second finger 116 has an edge 120 that is gradually radiused. The gradually radiused edge 120 of the second finger 116 permits a gradual disengagement of each link assembly 100 as it is rotated away from the leading edge 26 and about the drive pulley 86.

With continued reference to FIGS. 5 and 6, to adjust tension of the track wheel 96, and more particularly the continuous belt 98 about the frame 80, the idler pulley 88 includes a tensioning screw 122. As shown in FIG. 5, the tensioning screw 122 is connected between the idler pulley 88 and a bracket 124 coupled to one of the side plates 90. In this regard, the tensioning screw 122 is threadably engaged with the idler pulley 88 such that tightening of the tensioning screw 122 increases the continuous belt 98 tension by pulling the idler pulley 88 away from the drive pulley 86 and loosening of the tensioning screw 122 decreases the continuous belt 98 tension by moving the idler pulley 88 toward the drive pulley 86.

Figure 8:
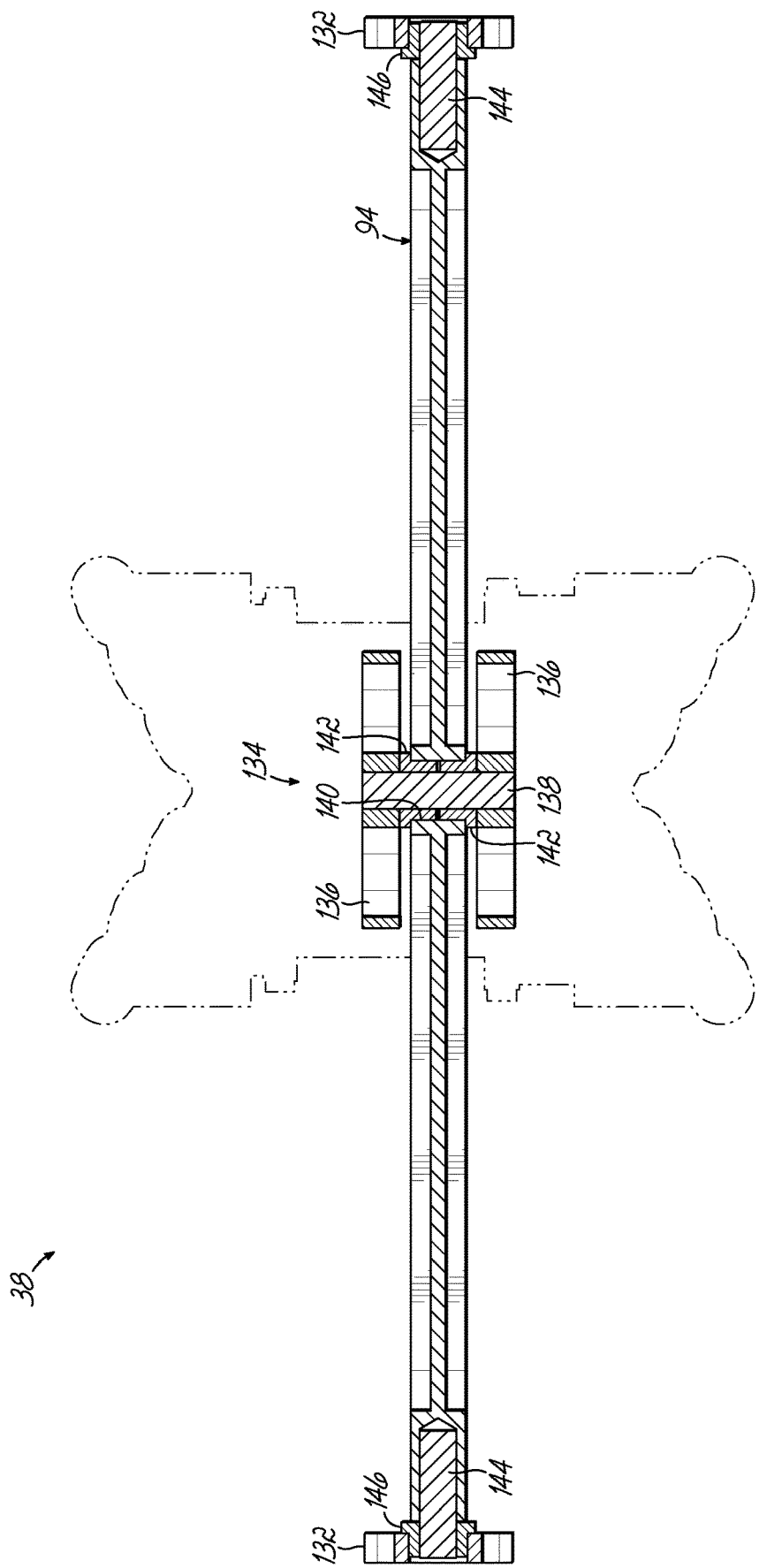
FIG. 8 is the cross-sectional view of FIG. 7, illustrating the support member.

With reference to FIGS. 7 and 8, the elongate support member 94 is configured to operatively couple the drive track 38 to the main body 40 of the robotic maintenance device 34. As shown, the elongate support member 94 includes a first end 126 and an opposite second end 128 and is disposed through an opening 130 in each of the side plates 90 so as to be generally transverse to the elongate frame 80. The first end 126 and second end 128 each include a bracket 132 configured to movably couple the support member 94 and thus the drive track 38, to the robotic maintenance device 34, as described in further detail below.

As shown in FIG. 8, the support member 94 is movably coupled to the frame 80 of the drive track 38 with a bushing assembly 134 that permits pivoting or yawing movement of the drive track 38 relative to the robotic maintenance device 34. In this regard, the bushing assembly 134 includes a pair of brackets 136 coupled between the side plates 90 with one bracket 136 positioned above the support member 94 and the other bracket 136 positioned below the support member 94. The pair of brackets 136 support an axle 138 which extends between the pair of brackets 136 and through a central bore 140 in the support member 94. The axle 138 includes a number of bushings 142 which permit rotational movement of the support member 94 about the axle 138. To this end, the axle 138 defines an axis of rotation about which the drive track 38 is configured to yaw when coupled to the robotic maintenance device 34 via the support member 94. The openings 130 in each of the side plates 90 through which the support member 94 extends serve to limit yawing movement of the drive track 38. Stated differently, rotational movement of the drive track 38 in either direction about the axle 138 is limited when the support member 94 abuts the side plate 90 at either opening 130. In a non-pivoted or normal state, a longitudinal axis of the support member 94 (e.g., an axis extending between the first and second ends 126, 128 of the support member 94) is generally perpendicular to a longitudinal axis of the drive track 38 (e.g., an axis extending between the first and second ends 82, 84 of the drive track 38). To this end, the drive track 38 may be configured to pivot or yaw relative to the support member 94 within a range of between plus or minus 2° to 10° from the non-pivoted or normal state. In the embodiment shown, the drive track 38 is configured to pivot or yaw plus or minus 5°.

With reference to FIGS. 7 and 8, and as noted above, the first end 126 and the second end 128 of the support member 94 each include a bracket 132 configured to movably couple the support member 94 and drive track 38 to the robotic maintenance device 34. In this regard, the support member 94 may span a width of the main body 40 of the robotic maintenance device 34 such that each end 126, 128 of the support member 94 is coupled to a respective side of the main body 40 of the robotic maintenance device 34 via the brackets 132 to support the drive track 38 therefrom. As shown, each end 126, 128 of the support member 94 includes a stub 144, or axle, to which the corresponding bracket 132 is rotatably coupled with a bushing 146. The engagement between the support member 94 and each bracket 132 permits the drive track 38 to rotate or pitch relative to the robotic maintenance device 34 when coupled thereto. To this end, the longitudinal axis of the support member 94 defines an axis of rotation about which the drive track 38 pitches when coupled to the robotic maintenance device 34. The robotic maintenance device 34 may include certain other structure, such as a stop bar (not shown) disposed through the frame 80, to limit pitching movement of the drive track 38. In a non-pitched or normal state, the longitudinal axis of the drive track 38 is generally in parallel with a longitudinal axis of the robotic maintenance device 34 (e.g., an axis extending between the first and second ends 42, 44 of the robotic maintenance device 34). The drive track 38 may be configured to pitch relative to the robotic maintenance device 34 within a range of between plus or minus 2° to 10° from the non-pivoted or normal state. In the embodiment shown, the drive track 38 is configured to pitch plus or minus 5°.

The pitching and yawing movement of the drive track 38 described above allows the drive track 38 to navigate uneven or curved surfaces as the robotic maintenance device 34 is moved along the wind turbine blade 20. The pitching and yawing movements also facilitate the initial positioning of the robotic maintenance device 34 on the leading edge 26 of the wind turbine blade 20.

With reference to FIGS. 5-7, the track wheel 96 includes the plurality of link assemblies 100 configured to engage with surfaces of the wind turbine blade 20. More particularly, each link assembly 100 supports a plurality of alignment elements 102 in a V-shaped arrangement such that the plurality of alignment elements 102 are configured to engage the leading edge 26 of the wind turbine blade 20 adjacent the leading edge 26. In this regard, the V-shaped configuration of the alignment elements 102 conforms generally to the shape of the blade 20 around the leading edge 26. More particularly, in one embodiment the plurality of link assemblies 100 may be spaced equally apart along a length of the continuous belt 98 such that the aligned V-shape of each link assembly 100 defines a pocket 148 configured to receive a portion of the leading edge 26 of the wind turbine blade 20 therein. In an embodiment, the link assemblies 100 may be non-uniformly spaced along the length of the continuous belt 98. As shown in FIG. 5, the pocket 148 extends generally between the first end 82 and the second end 84 of the drive track 38. The plurality of alignment elements 102 in engagement with the wind turbine blade 20 along a length of the pocket 148 are responsible for movement of the drive track 38 and robotic maintenance device 34 in the first movement direction A1, as well as movement in the second movement direction A2, as described in further detail below.

Figure 9:
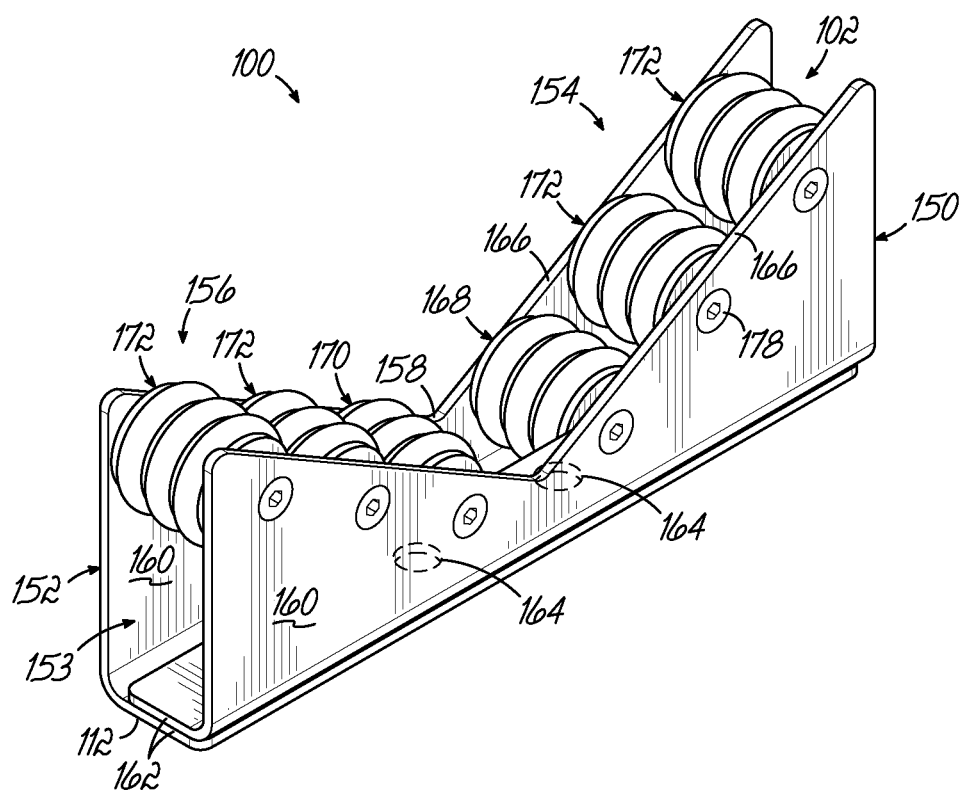
FIG. 9 is a perspective view of a link assembly of the drive track shown in FIG. 5 in accordance with an embodiment of the invention.
Figure 10:
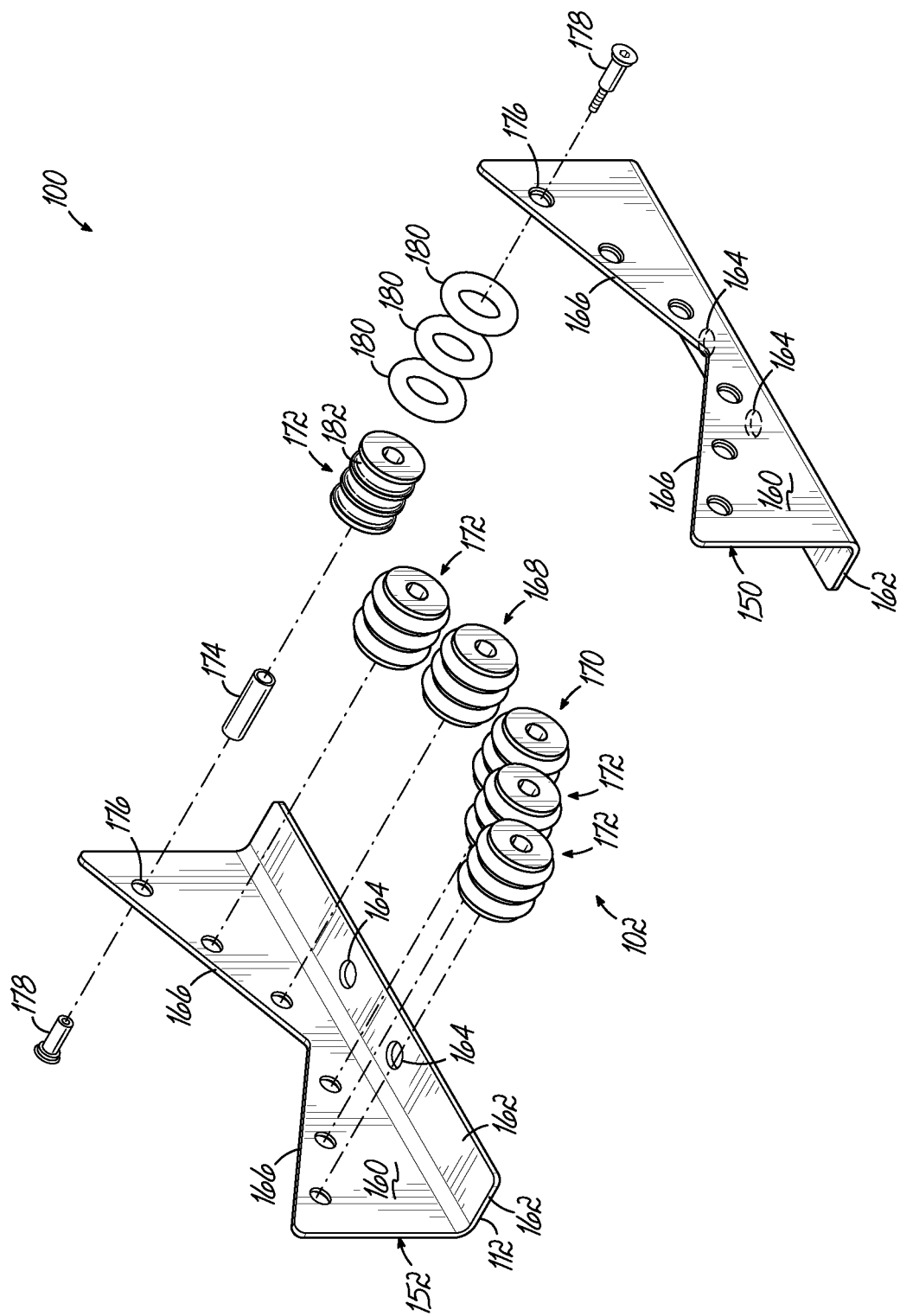
FIG. 10 is an exploded view of the link assembly shown in FIG. 7, illustrating details of a plurality of alignment elements supported by the link assembly in accordance with an embodiment of the invention.

With reference to FIGS. 9 and 10, details of an exemplary link assembly 100 are shown and will now be described. In this regard, each link assembly 100 includes a first bracket 150 and a second bracket 152 coupled together to form the link assembly 100. More particularly, the brackets 150, 152 form a U-shaped channel 153 that extends a length of the link assembly 100 and between a first side 154 and a second side 156 of the link assembly 100. As described in further detail below, the first side 154 and the second side 156 are separated by a vertex 158 of the link assembly 100 and each side 154, 156 supports at least one of the plurality of alignment elements 102. Each bracket 150, 152 is generally plate-like and includes a sidewall 160 and a flanged base 162. The base 162 of each bracket 150, 152 may be sized differently to allow the brackets 150, 152 to be coupled together, as shown. In this regard, the brackets 150, 152 are coupled together at their bases 162 with appropriate fasteners, such as a screw, pin, bolt, or other suitable fastener, which is received through aligned bores 164 in the base 162 of each bracket 150, 152. The fasteners may be the same fasteners used to couple the link assembly 100 to the continuous belt 98, for example. In any event, the sidewall 160 of each bracket 150, 152 includes a pair of angled edges 166 which form a V-shape of the sidewall 160. Collectively, the sidewalls 160 and respective angled edges 166 define the vertex 158 of the link assembly 100. To this end, the vertex 158 separates the first side 154 from the second side 156.

As shown in FIG. 9, the alignment elements 102 are disposed between the sidewalls 160 of the brackets 150, 152 so as to be positioned partially within the U-shaped channel 153 of the link assembly 100. The sidewalls 160 of each bracket 150, 152 are spaced apart to define a width of the U-shaped channel 153 which generally corresponds to a size of the alignment elements 102. As shown, each adjustment element 102 is coupled between the brackets 150, 152 and spaced apart along the angled edges 166 of the sidewalls 160. In this regard, each adjustment element 102 is located adjacent to corresponding angled edges 166 such that a portion of the adjustment element 102 is exposed beyond the angled edges 166 to engage with surfaces of the wind turbine blade 20 while a remainder of the adjustment element 102 is recessed within the U-shaped channel 153. The first side 154 and the second side 156 of the link assembly 100 each support a grouping, or series, of alignment elements 102 which are spaced apart along the angled edges 166, as described above. In the embodiment shown, the first and second side 154, 156 each include three alignment elements 102 in series. In this regard, the series of alignment elements 102 supported by the first side 154 includes a first proximal adjustment element 168 that is the closest adjustment element 102 of the series to the vertex 158 of the link assembly 100. Similarly, the series of alignment elements 102 supported by the second side 156 includes a second proximal adjustment element 170 that is the closest adjustment element 102 of the series to the vertex 158 of the link assembly 100. As will be described in further detail below, a distance between the first proximal adjustment element 168 and the second proximal adjustment element 170 may be varied for each link assembly 100 in a series of adjacent link assemblies 100 to define an adjustment element pattern for the series of adjacent link assemblies 100. To this end, the link assemblies 100 of the track wheel 96 may have different, or varying configurations of alignment elements 102, as will be described in further detail below.

In the embodiment shown, the plurality of alignment elements 102 are rollers 172. As best shown in FIG. 10, each roller 172 is coupled between the brackets 150, 152 with a pin 174 about which the roller 172 is configured to rotate. Thus, the pin 174 defines an axis of rotation for the roller 172. Each pin 174 extends between aligned bores 176 in the sidewalls 160 of the brackets 150, 152 and is held in place with appropriate fasteners 178, such as a screws or bolts, for example. Each roller 172 includes at least one O-ring 180 that is configured engage with surfaces of the wind turbine blade 20, as described in further detail below. In the embodiment shown, each roller 172 includes three O-rings 180, however, fewer or more O-rings 180 may be used as desired. The O-rings 180 are formed of a high friction material, which may be a rubber or synthetic rubber such as ethylene propylene diene monomer rubber (EPDM), for example. Each roller 172 may include grooves 182 configured to receive respective O-rings 180 to prevent slippage of the O-ring 180 during operation of the drive track 38.

Figure 11:
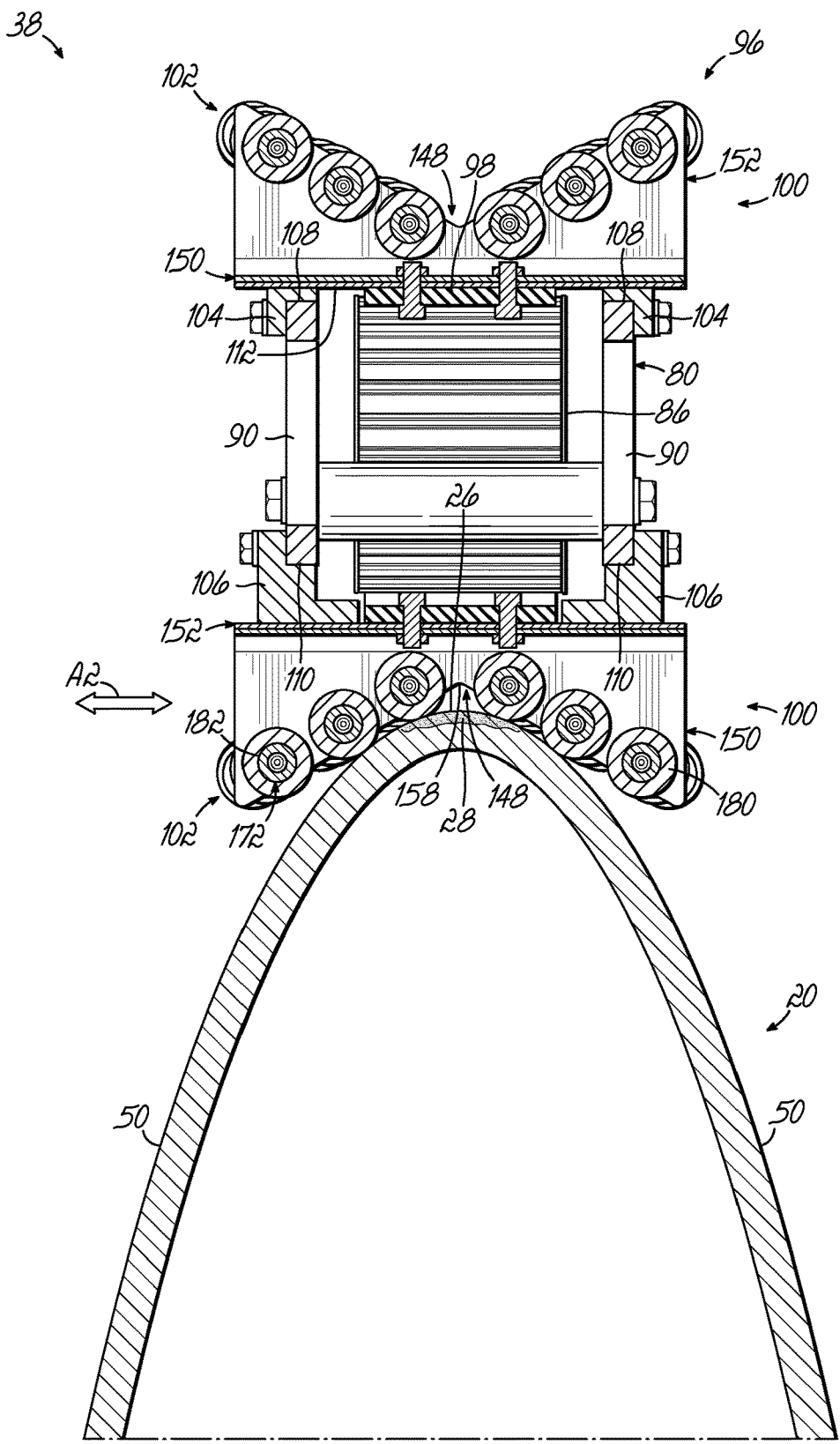
FIG. 11 is a cross-sectional through the drive track shown in FIG. 6 taken generally along line 11-11, illustrating the drive track engaged with the leading edge of a wind turbine.

FIG. 11 shows the drive track 38 aligned over the leading edge 26 with the leading edge 26 positioned squarely within the pocket 148 formed by the link assemblies 100 of the track wheel 96. The cross-section in FIG. 11 is closer to the tip end 24 of the wind turbine blade 20, thus fewer of the alignment elements 102 may be in contact with surfaces of the leading edge 26. In this regard, the profile of the wind turbine blade 20 varies along the length of the blade 20 such that the blade 20 is thicker towards the root end 22 and thinner towards the tip end 24, as should be understood by a person having ordinary skill in the art. Thus, when the drive track 38 is engaged with the wind turbine blade 20 near the root end 22, most alignment elements 102, if not all alignment elements 102 of each downwardly facing link assembly 100, may be in contact with surfaces of the leading edge 26. However, when the drive drack 38 is engaged with the wind turbine blade 20 near the tip end 24, some of the alignment elements 102 may lose contact with the surfaces of the leading edge 26.

With continued reference to FIG. 11, the vertex 158 of each link assembly 100 engaged with the leading edge 26 is generally centered over the leading edge 26. As shown, many, if not all, of the alignment elements 102 of each link assembly 100 facing the leading edge 26 are engaged with blade 20 adjacent the leading edge 26. When so positioned, the axis of rotation of each roller 172 is generally parallel with the first movement direction A1 of the robotic maintenance device 34. In this regard, the O-rings 180 are configured to grip the wind turbine blade 20 to move the robotic maintenance device 34 in the first movement direction A1. The engagement between each O-ring 180 and the wind turbine blade 20 results in a high coefficient of friction therebetween which yields movement of the robotic maintenance device 34 in the first movement direction A1. Thus, as the drive track 38 rotates the track wheel 96 about the frame 80, the alignment elements 102, and more particularly the O-rings 180, experience a lateral force in a direction that is parallel to the rotational axis of each roller 172 engaged with the leading edge 26. As the lateral force is parallel to the rotational axis of each roller 172, the track wheel 96 is able to grip the wind turbine blade 20 with the alignment elements 102 to thereby propel the robotic maintenance drive 34 in the first movement direction A1 as the track wheel 96 is driven about the frame 80 of the drive track 38.

With continued reference to FIG. 11, the alignment elements 102 engaged with the leading edge 26 also permit movement of the drive track 38 and robotic maintenance device 34 in the second movement direction A2 to correct any misalignment of the drive track 38 and robotic maintenance device 34 over the leading edge 26. In this regard, as the drive track 38 moves the robotic maintenance device 34 in the first movement direction A1, the drive track 38 may become misaligned with the leading edge 26 as it moves therealong. This could be caused by a curvature in the leading edge 26, for example. However, as the drive track 38 becomes misaligned with the leading edge 26 (e.g., the drive track 38 deviates to either side 50 of the blade 20 such that the leading edge 26 is no longer positioned squarely within the pocket 148 of the track wheel 96), rotation of the alignment elements 102 causes the drive track 38 to move in the second movement direction A2 and back to the aligned position over the leading edge 26, as shown in FIG. 11. Rotation of the alignment elements 102 in this regard is caused by the weight of the robotic maintenance device 34, or a normal force, acting in a downward direction on the drive track 38. Thus, once the robotic maintenance device 34 deviates so far to one side 50 of the blade 20, or the other, the normal force causes rotational movement of a certain number of the alignment elements 102 in engagement with the wind turbine blade 20 to thereby return the drive track 38 to being aligned over the leading edge 26. To this end, repeated or continuous self-adjustment of the drive track 38 in the second movement direction A2, as described above, maintains proper orientation of the drive track 38 and robotic maintenance device 34 over the leading edge 26 of the blade 20 for repair actions.

Figure 12:
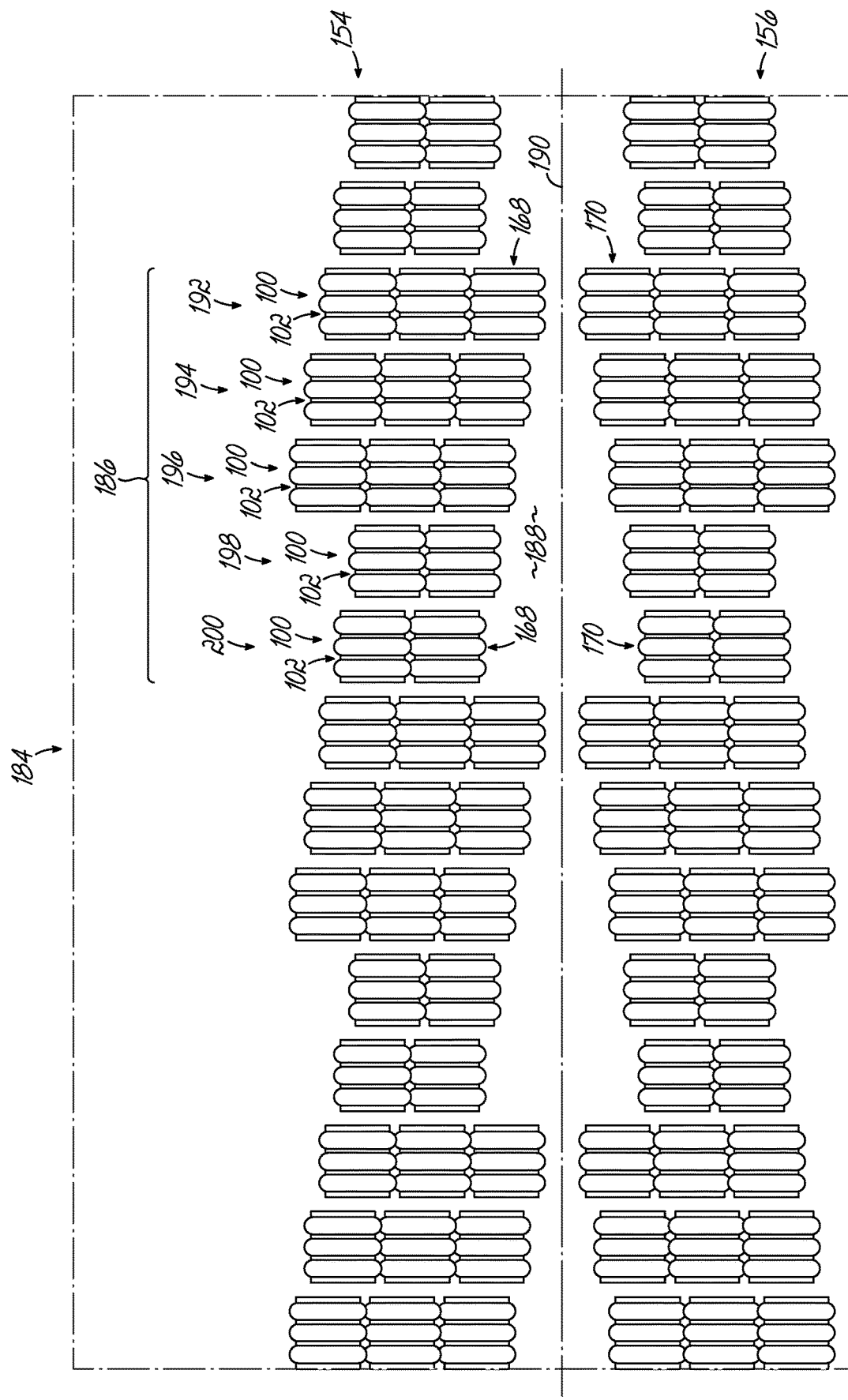
FIG. 12 is a schematic top view of a section of a continuous belt of the drive track shown in FIG. 5, illustrating a link assembly roller pattern that is repeated over a length of the continuous belt.

To facilitate the self-adjusting movements of the drive track 38 and robotic maintenance device 34 in the second movement direction, adjacent link assemblies 100 of the track wheel 96 may have varying configurations of alignment elements 102 that collectively form a repeating pattern of alignment elements 102 along a length of the track wheel 96. In this regard, FIG. 12 illustrates a section 184 of the track wheel 96, shown in schematic form, having an adjustment element pattern 186 in accordance with one embodiment of the invention. The adjustment element pattern 186 is repeated over an entire length of the continuous belt 98 of the track wheel 96. The adjustment element pattern 186 includes a series of adjacent link assemblies 100 each of which have a different configuration of alignment elements 102. In the embodiment shown, the adjustment element pattern 186 includes a series of five adjacent link assemblies 100. However, other adjustment element patterns may involve fewer or more link assemblies 100. In any event, the adjustment element pattern 186 forms a central region 188 along the track wheel 96 that is devoid of alignment elements 102. As shown, the central region 188 is generally triangular in shape and extends along a common vertex 190 of the adjacent link assemblies 100. To this end, the common vertex 190 defines a line of symmetry of the triangular-shaped central region 188.

With continued reference to FIG. 12, the adjustment element pattern 186 is repeated every five link assemblies 100 and is defined by a first link assembly 192 that has a total of six alignment elements 102, with a grouping of three alignment elements 102 supported by each of the first side 154 and the second side 156. The first proximal adjustment element 168 and the second proximal adjustment element 170 of the first link assembly 192 are spaced apart a first distance. A second link assembly 194 adjacent to the first link assembly 192 also has total of six alignment elements 102, with a grouping of three alignment elements 102 supported by each of the first side 154 and the second side 156. The first proximal adjustment element 168 and the second proximal adjustment element 170 of the second link assembly 194 are spaced apart a second distance. As shown, the second distance is greater than the first distance. A third link assembly 196 adjacent to the second link assembly 194 also has total of six alignment elements 102, with a grouping of three alignment elements 102 supported by each of the first side 154 and the second side 156. The first proximal adjustment element 168 and the second proximal adjustment element 170 of the third link assembly 196 are spaced apart a third distance. As shown, the third distance is greater than the second distance. Next, a fourth link assembly 198 adjacent to the third link assembly 196 has a total of only four alignment elements 102, with a grouping of two alignment elements 102 supported by each of the first side 154 and the second side 156. The first proximal adjustment element 168 and the second proximal adjustment element 170 of the fourth link assembly 198 are spaced apart a fourth distance. As shown, the fourth distance is greater than the third distance. Lastly, a fifth link assembly 200 adjacent to the fourth link assembly 198 has a total of four alignment elements 102, with a grouping of two alignment elements 102 supported by each of the first side 154 and the second side 156. The first proximal adjustment element 168 and the second proximal adjustment 170 element of the fifth link assembly 200 are spaced apart a fifth distance. As shown, the fifth distance is greater than the fourth distance.

As the track wheel 96 is rotated about the drive track 38 to move the robotic maintenance device 34 along the leading edge 26, the fifth link assembly 200 is configured to be the first of the series of link assemblies 192, 194, 196, 198, 200 of the adjustment element pattern 186 to engage the leading edge 26 as the track wheel 96 is rotated about the frame 80 to move the robotic maintenance device 34 along the leading edge 26. This ensures that the weight of the robotic maintenance device 34 is distributed evenly over surfaces of the leading edge 26. The varied configuration of the adjustment elements 102 of the adjustment element pattern 186 creates an even distribution of contact points, or footprint, between the drive track 38 and surfaces of the leading edge 26. More particularly, the number of contact points between the drive track 38 and surfaces of the leading edge 26 is high. As a result, each drive track 38 can support a heavier load over the leading edge 26.

The adjustment element pattern 186 described above is exemplary of one possible pattern, and it is understood that the number of alignment elements 102 supported by each link assembly 100, as well as the distances between the first proximal adjustment element 168 and the second proximal adjustment element 170 of each link assembly 100, may be varied to form different patterns. For example, a series of adjacent link assemblies 100 may be configured to form an adjustment element pattern having a diamond, square, rectangular, or other polygonal-shaped central region 188 devoid of alignment elements 102, for example. Alternatively, there may be no central region 188 devoid of alignment elements 102.

Figure 13A:
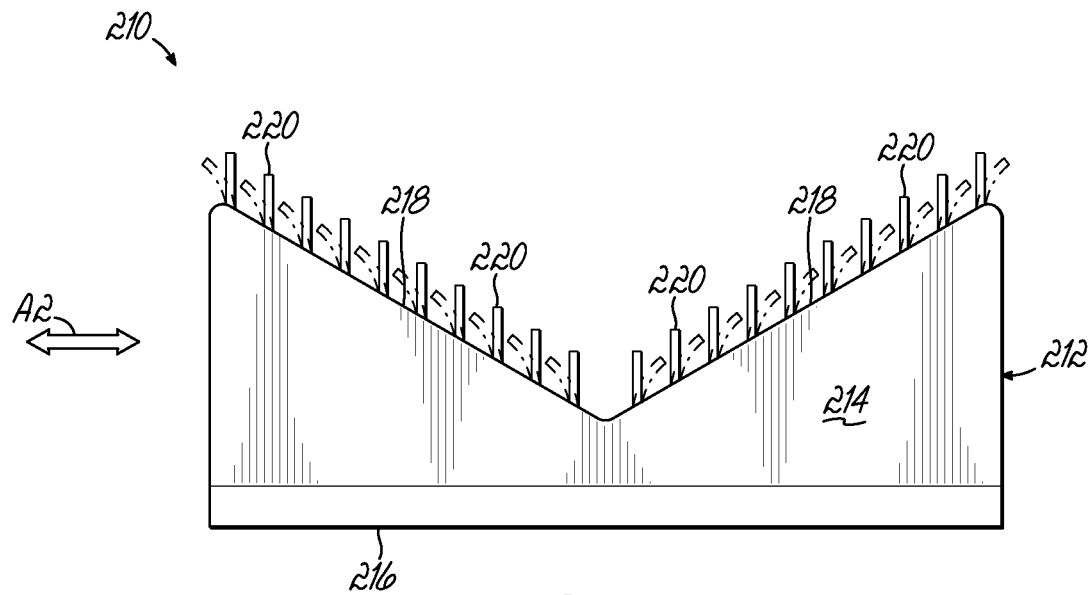
FIG. 13A is a front view of a link assembly of the drive track having flexure elements in accordance with another embodiment of the present invention, illustrating movement of the flexure elements in a second movement direction.
Figure 13B:
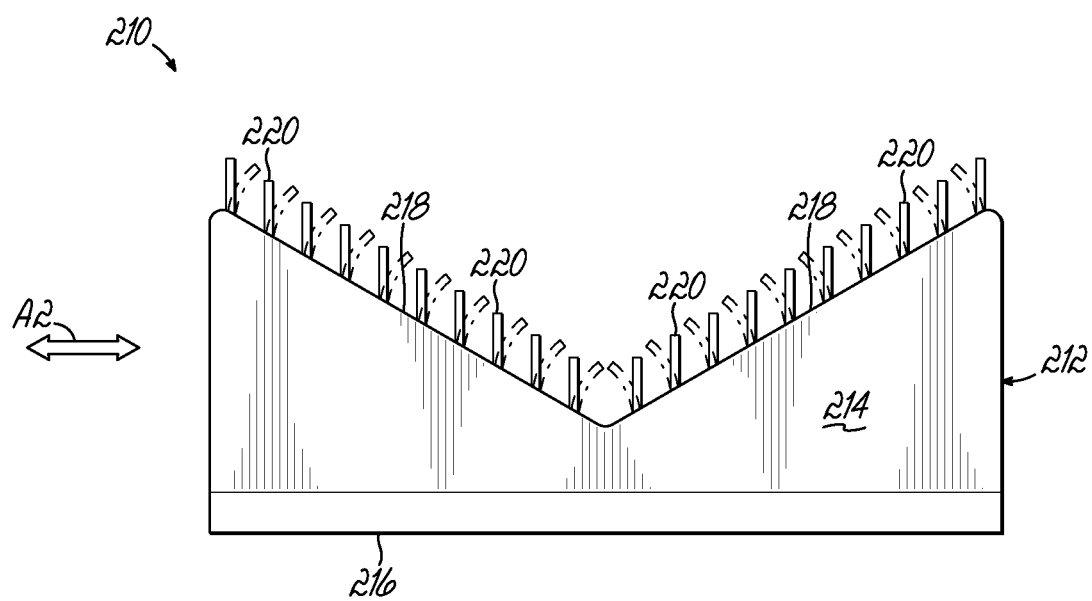
FIG. 13B is a front view of a link assembly of FIG. 13A, further illustrating movement of the flexure elements in the second movement direction.

FIGS. 13A-13B illustrate a link assembly 210 in accordance with an embodiment of the disclosure. The link assembly 210 of this embodiment includes a body 212 having a sidewall 214 that extends between a base 216 and two angled surfaces 218 which create a V-shaped profile of the link assembly 210. The angled surfaces 218 each operatively support a plurality of flexure elements 220 configured to permit movement of the robotic maintenance device 34 in the second movement direction A2. In this regard, the flexure elements 220 of this embodiment are configured to promote movement of the drive track 38 and robotic maintenance device 34 under similar circumstances compared to the alignment elements 102 of the previously described embodiment. The flexure elements 220 are configured to engage with the wind turbine blade 20 adjacent leading edge 26 and to pivot, or flex, in the second movement direction A2 to correct any misalignment of the drive track 38 and robotic maintenance device 34 over the leading edge 26. In one embodiment, the flexure elements 220 may be pins, such as a bar or cylinder of material, that extends a distance away from the corresponding angled surface 218. In another embodiment, the flexure elements 220 may be elongate strips of material that form fins, or blades, along the angled surfaces 218 of the link assembly 210. In this regard, the flexure elements 220 may be arranged as one or more lamellas. The flexure elements 220 may be formed from a moderate to high tensile rubber, coated spring steel, or other suitable material, for example.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. For example, while the above drive track has been described as part of a repair maintenance device for wind turbine blades, the drive track may be beneficial to a broader range of devices or vehicles for allowing at least two degrees of freedom in movement in order to remain aligned along a travel path, such as a curved travel path. Accordingly, aspects of the present invention should not be limited to the specific wind turbine application disclosed herein. Moreover, the various features of the invention may be used alone or in any combination depending on the needs and preferences of the user, and the features described in the different embodiments are not dependent on one another for operation of the invention.

The invention claimed is:

1. A robotic maintenance device for repairing damage around a leading edge of a wind turbine blade on a wind turbine, the robotic maintenance device comprising:
    at least one drive track, the drive track comprising:
        an elongate frame;
        at least one drive pulley rotatably coupled to the frame and configured to be operatively coupled to a drive for rotating the at least one drive pulley;
        at least one idler pulley rotatably coupled to the frame; and
        a track wheel disposed about the frame, the track wheel comprising:
            a continuous belt in engagement with the at least one drive pully and the at least one idler pulley and configured to be rotated about the frame by the at least one drive pulley; and
            a plurality of link assemblies coupled to the continuous belt, each of the plurality of link assemblies including a plurality of alignment elements configured to engage with a surface of the wind turbine blade adjacent the leading edge;
        wherein the plurality of alignment elements is configured such that rotation of the continuous belt defines a first movement direction of the robotic maintenance device along the leading edge; and
        wherein the plurality of alignment elements is further configured to allow, using a weight of the robotic maintenance device, passive movement of the robotic maintenance device in a second movement direction perpendicular to the first movement direction; and
    an applicator tool supported by the robotic maintenance device and configured to apply a coating material over the damage on the wind turbine blade as the robotic maintenance device is driven in the first movement direction along the leading edge of the wind turbine blade with the at least one drive track configured to correct misalignment of the robotic maintenance device over the leading edge of the wind turbine blade through passive movement of the robotic maintenance device in the second movement direction by the at least one drive track under the weight of the robotic maintenance device.

2. The robotic maintenance device of claim 1, wherein each of the plurality of alignment elements includes a roller with at least one O-ring formed of a friction material.

3. The robotic maintenance device of claim 2, wherein an axis of rotation of the roller is parallel to the first movement direction of the vehicle.

4. The robotic maintenance device of claim 1, wherein the plurality of alignment elements further comprises a plurality of flexure elements, each of the plurality of flexure elements being capable of flexing in the second movement direction.

5. The robotic maintenance device of claim 4, wherein the plurality of flexure elements further comprises a plurality of flexible fins extending in the first movement direction and arranged in one or more lamellas.

6. The robotic maintenance device of claim 1, wherein each of the plurality of link assemblies supports the plurality of alignment elements in a V-shaped arrangement.

7. The robotic maintenance device of claim 6, wherein each of the plurality of link assemblies includes a first bracket and a second bracket, each of the first and second brackets including a sidewall with a pair of angled edges forming a V-shape with a vertex, wherein at least one of the plurality of alignment elements is disposed between the first and second brackets on each side of the vertex.

8. The robotic maintenance device of claim 7, wherein an alignment element of the plurality of alignment elements closest to the vertex on a first side of the link assembly defines a first proximal alignment element and an alignment element of the plurality of alignment elements closest to the vertex on a second side of the link assembly defines a second proximal alignment element, wherein a group of adjacent link assemblies of the plurality of link assemblies defines a series of link assemblies, and wherein a distance between the first proximal alignment element and the second proximal alignment element is varied for each link assembly in the series of link assemblies to define an alignment element pattern for the series of link assemblies.

9. The robotic maintenance device of claim 8, wherein the plurality of link assemblies along a length of the continuous belt defines a plurality of series of link assemblies, and wherein each of the plurality of series of link assemblies has the same alignment element pattern.

10. The robotic maintenance device of claim 8, wherein the alignment element pattern further includes varying a number of the plurality of alignment elements supported by at least two link assemblies in the series of adjacent link assemblies.

11. The robotic maintenance device of claim 1, wherein the elongate frame includes a pair of spaced apart side plates.

12. The robotic maintenance device of claim 11, wherein the at least one drive pulley is rotatably coupled between the pair of spaced apart side plates adjacent a first end of the frame, and wherein the at least one idler pulley is rotatably coupled between the pair of spaced apart side plates adjacent a second end of the frame.

13. The robotic maintenance device of claim 11, wherein each side plate includes an upper track wheel support and a lower track wheel support configured to engage with the plurality of link assemblies.

14. The robotic maintenance device of claim 13, wherein each lower track wheel support includes a first arcuate finger and a second arcuate finger located at opposite longitudinal ends of the lower track wheel support, the first finger and the second finger configured to guide the plurality of link assemblies onto or off of the surface during operation of the vehicle.

15. The robotic maintenance device of claim 1, wherein the at least one idler pulley includes a tensioning screw for adjusting a tension of the continuous belt.

16. The robotic maintenance device of claim 1, wherein the elongate frame includes an elongate support member configured to couple the drive track to the vehicle.

17. The robotic maintenance device of claim 16, wherein the elongate support member is disposed transverse to the elongate frame.

18. The robotic maintenance device of claim 16, wherein the elongate support member is operatively coupled to the frame to allow the drive track to rotate relative to the vehicle about a yaw axis.

19. The robotic maintenance device of claim 16, wherein the elongate support member includes a first end and a second end each movably coupled to the vehicle to allow the drive track to rotate relative to the vehicle about a pitch axis.

20. A method of effectuating repair of erosion damage around a leading edge of a wind turbine blade on a wind turbine, comprising:
positioning a robotic maintenance device according to claim 1 on the leading edge of the wind turbine blade,
with the at least one drive track, moving the robotic maintenance device along the leading edge,
with the applicator tool, applying and forming the coating material into a smooth and continuous coating over the erosion damage as the robotic maintenance device moves along the leading edge,
wherein misalignment of the robotic maintenance device over the leading edge of the wind turbine blade is corrected through movement of the robotic maintenance device in the second movement direction by the at least one drive track under the weight of the robotic maintenance device.

* * * * *